United States Patent
Miura et al.

(10) Patent No.: US 9,287,059 B2
(45) Date of Patent: Mar. 15, 2016

(54) ELECTRIC STORAGE DEVICE AND METHOD OF MANUFACTURE THEREOF

(71) Applicant: PANASONIC CORPORATION, Osaka (JP)

(72) Inventors: Teruhisa Miura, Kyoto (JP); Ikufumi Oshima, Osaka (JP); Kazuhiro Murakami, Osaka (JP); Hideki Shimamoto, Kyoto (JP); Shusaku Kawasaki, Osaka (JP); Susumu Nomoto, Kyoto (JP); Motohiro Sakata, Osaka (JP); Kouji Ueoka, Nara (JP); Masayuki Shinjou, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 87 days.

(21) Appl. No.: 14/301,691

(22) Filed: Jun. 11, 2014

(65) Prior Publication Data
US 2014/0293510 A1    Oct. 2, 2014

Related U.S. Application Data

(63) Continuation of application No. PCT/JP2012/007969, filed on Dec. 13, 2012.

(30) Foreign Application Priority Data

| Dec. 15, 2011 | (JP) | 2011-274178 |
| Dec. 15, 2011 | (JP) | 2011-274179 |
| Dec. 15, 2011 | (JP) | 2011-274180 |
| Dec. 15, 2011 | (JP) | 2011-274181 |

(51) Int. Cl.
*H01G 9/00* (2006.01)
*H01G 11/80* (2013.01)
(Continued)

(52) U.S. Cl.
CPC ............... *H01G 11/80* (2013.01); *H01G 9/008* (2013.01); *H01G 9/08* (2013.01); *H01G 9/10* (2013.01);
(Continued)

(58) Field of Classification Search
CPC .......... H01G 9/08; H01G 9/10; H01G 9/008; H01G 9/016; H01G 9/145
USPC .............. 361/502, 504, 509–512, 516–519, 361/525–529, 535–537, 540
See application file for complete search history.

(56) References Cited

U.S. PATENT DOCUMENTS

6,456,484 B1 * 9/2002 Matsuoka ............... H01G 9/06
                                                    361/502
7,382,600 B2 * 6/2008 Paul ....................... H01G 9/008
                                                    361/502
(Continued)

FOREIGN PATENT DOCUMENTS

| JP | 03-038010 A | 2/1991 |
| JP | 07-326551 A | 12/1995 |

(Continued)

OTHER PUBLICATIONS

International Search Report issued in PCT/JP2012/007969, dated Mar. 26, 2013, with English translation.

*Primary Examiner* — Nguyen T Ha
(74) *Attorney, Agent, or Firm* — McDermott, Will & Emery LLP

(57) ABSTRACT

In an electric storage device, a terminal plate includes an element-connecting part electrically connected to a first electrode at a first end of an electric storage element, and an external terminal connected to this element-connecting part. A sealing member is on the element-connecting part, and includes a hole where the external terminal is inserted. The sealing member and the external terminal seal an opening of an outer jacket. The external terminal includes a tapered part on its outer periphery at a tip, and is partially exposed from the sealing member. The tapered part includes a first end and a second end farther away from the element-connecting part than the first end. An edge of a side wall at the opening of the outer jacket is between the first and second ends of the tapered part in a first direction extending from the bottom to the opening of the outer jacket.

27 Claims, 15 Drawing Sheets

(51) Int. Cl.
*H01G 9/10* (2006.01)
*H01G 9/08* (2006.01)
*H01G 9/008* (2006.01)
*H01M 2/06* (2006.01)
*H01M 2/30* (2006.01)
*H01M 2/26* (2006.01)
*H01G 11/82* (2013.01)
*H01G 11/52* (2013.01)
*H01G 11/74* (2013.01)
*H01G 11/78* (2013.01)

(52) U.S. Cl.
CPC ............... *H01G 11/52* (2013.01); *H01G 11/74* (2013.01); *H01G 11/82* (2013.01); *H01M 2/06* (2013.01); *H01M 2/263* (2013.01); *H01M 2/30* (2013.01); *H01G 11/78* (2013.01); *Y02E 60/13* (2013.01); *Y02T 10/7022* (2013.01)

(56) References Cited

U.S. PATENT DOCUMENTS

| | | | | |
|---|---|---|---|---|
| 7,474,520 B2 * | 1/2009 | Kashihara | ............... | H01G 9/016 361/502 |
| 8,045,320 B2 * | 10/2011 | Hibi | ....................... | H01G 9/008 361/502 |
| 8,184,429 B2 * | 5/2012 | Yamane | .................. | H01G 9/008 361/306.1 |
| 8,488,301 B2 * | 7/2013 | Wetherill | ............... | H01G 11/70 361/502 |
| 2002/0191370 A1 | 12/2002 | Matsuoka et al. | | |
| 2003/0128500 A1 | 7/2003 | Matsuoka et al. | | |
| 2006/0187615 A1 | 8/2006 | Hozumi et al. | | |
| 2009/0296316 A1 * | 12/2009 | Shimizu | ................... | H01G 9/10 361/502 |

FOREIGN PATENT DOCUMENTS

| | | |
|---|---|---|
| JP | 10-275751 A | 10/1998 |
| JP | 2001-068379 A | 3/2001 |
| JP | 2002-083739 A | 3/2002 |
| JP | 2007-335156 A | 12/2007 |
| JP | 2009-016587 A | 1/2009 |
| JP | 2009-194131 A | 8/2009 |
| WO | 2005-038837 A1 | 4/2005 |

\* cited by examiner

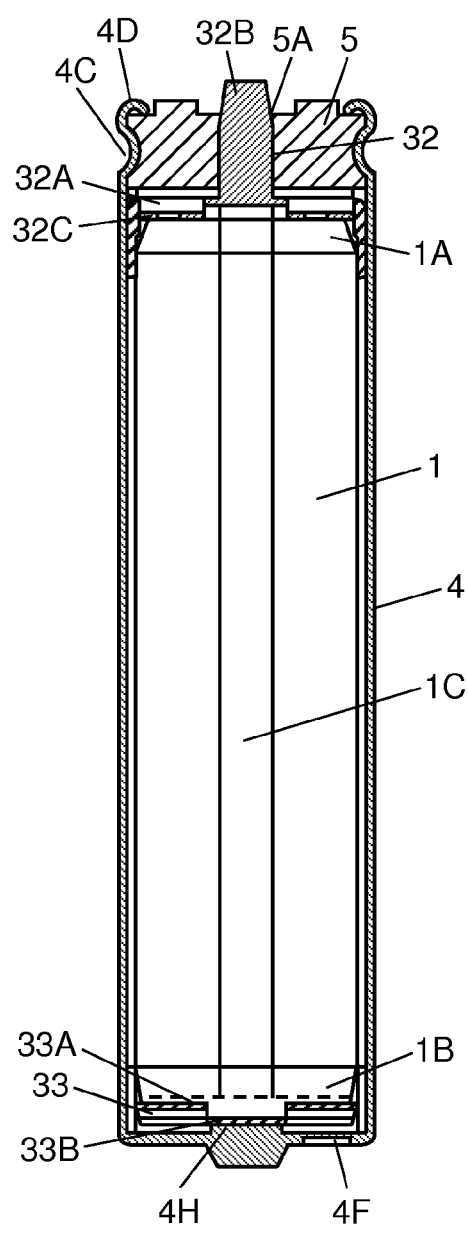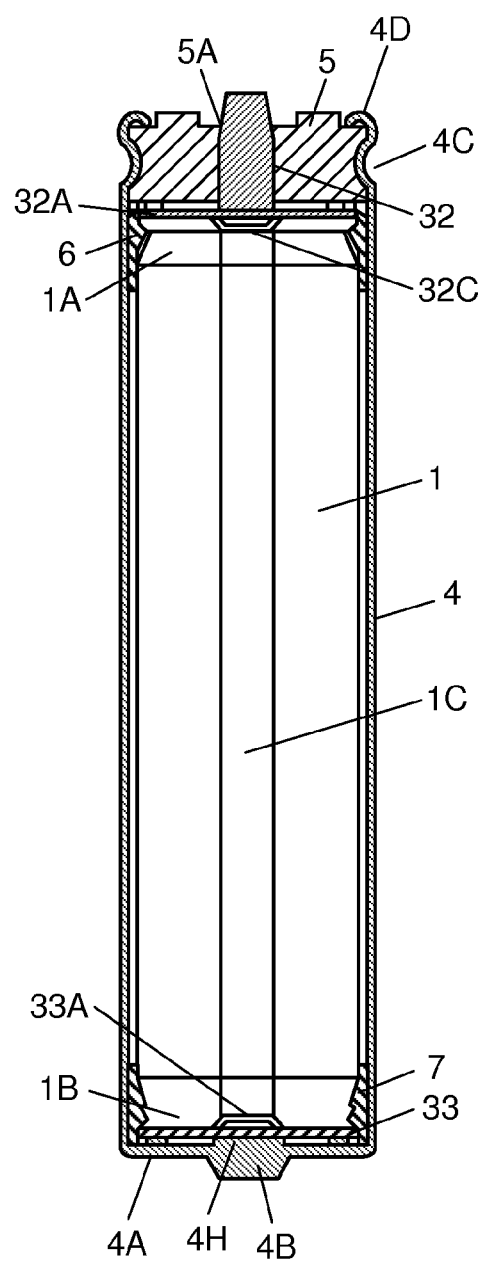

ELECTRIC STORAGE DEVICE AND METHOD OF MANUFACTURE THEREOF

RELATED APPLICATIONS

This application is a continuation of International Application No. PCT/JP2012/007969, filed on Dec. 13, 2012, which in turn claims the benefit of Japanese Application No. 2011-274178, filed on Dec. 15, 2011, Japanese Application No. 2011-274179, filed on Dec. 15, 2011, Japanese Application No. 2011-274180, filed on Dec. 15, 2011 and Japanese Application No. 2011-274181, filed on Dec. 15, 2011, the disclosures of which Applications are incorporated by reference herein.

BACKGROUND

1. Technical Field

The present technical field relates to electric storage devices typically used for regeneration or power storage in a range of electronic devices and hybrid vehicles, and manufacturing methods thereof.

2. Background Art

FIG. 21 is a front sectional view of an electric double-layer capacitor, which is an example of a conventional electric storage device. This capacitor includes capacitor element 101, two collector plates 102, tubular metal case 105 with bottom 105A, terminal plate 103 partially exposed to the outside of case 105, and sealing rubber 106.

Capacitor element 101 includes positive electrode end 101A and negative electrode end 101B (hereafter referred to as ends 101A and 101B) at opposed positions. Collector plates 102 are welded to ends 101A and 101B, respectively. Capacitor element 101 is housed in case 105 such that collector plate 102 welded to end 101B faces bottom 105A. Collector plate 102 welded to end 101A is disposed at an opening of case 105, and is coupled to terminal plate 103. Sealing rubber 106 is provided between terminal plate 103 and the opening of case 105 to insulate them. Horizontally drawn part 105B is formed from the outside to inside of the opening of case 105 against sealing rubber 106 so that sealing rubber 106 is compressed to seal the opening. In addition, an end of the opening of case 105 is bent inward to form bent part 105C.

Capacitor element 101 includes a positive electrode, a negative electrode, and a separator (none of them are illustrated). Each of the positive electrode and the negative electrode is configured by applying an electrode layer containing carbon material to a strip of collector except for one end. In capacitor element 101, these positive and negative electrodes face each other and are shifted such that portions without electrode layers on their collectors protrude in the opposite directions, and are wound with the separator therebetween. Accordingly, the portions without electrode layers of the electrodes configure ends 101A and 101B, respectively.

Terminal plate 103 is provided with a through hole for linking inside and outside case 105. Pressure-adjusting valve 104 for preventing pressure rise inside case 105 is provided so as to cover this through hole in.

In this structure, sheet-like electrodes and collectors 102 are in plane contact, respectively, to take out current from capacitor element 101. Accordingly, power can be collected at low resistance inside electric double-layer capacitor (e.g., Japanese Patent Unexamined Publication No. 2009-194131).

SUMMARY

The present disclosure relates to an electric storage device with improved workability for setting a sealing member, and a manufacturing method thereof.

An electric storage device of various embodiments includes an electric storage element, electrolyte with which the electric storage element is impregnated, a terminal plate, an outer jacket, and a sealing member. The electric storage element includes a first electrode, second electrode, and first end where the first electrode is led out. The terminal plate includes an element-connecting part electrically connected to the first electrode at the first end, and an external terminal connected to the element-connecting part. The outer jacket includes a bottom and a tubular side wall extending from the bottom, and having an opening located opposite to the bottom. The outer jacket is formed of a conductive material, and houses the electric storage element together with the electrolyte such that the terminal plate located nearer the opening than the bottom. The sealing member is disposed on the element connecting part, and is provided with an insertion hole where the external terminal is inserted. The sealing member seals the opening of the outer jacket together with the external terminal. The external terminal is a columnar or tubular body with a tapered part on an outer periphery at a tip thereof. A part of the external terminal is exposed from the sealing member. The tapered part includes a first end and a second end further away from the element connecting part than the first end. An edge of the side wall at the opening of the outer jacket is disposed between the first end and the second end of the tapered part in a first direction extending from the bottom to the opening of the outer jacket.

The electric storage device of the embodiments is manufactured according to the following steps:

fabricating an electric storage element including the first electrode, second electrode, and first end where the first electrode is led out, electrically connecting an element connecting part of a terminal plate and the first electrode at the first end of the electric storage element, the terminal plate including the element connecting part and the external terminal connected to the element connecting part, housing the electric storage element connected to the terminal plate together with an electrolyte in an outer jacket formed of conductive material and including a bottom and a tubular side wall with an opening disposed opposite to the bottom, such that the terminal plate is located nearer the opening than the bottom, inserting the external terminal into an insertion hole of the sealing member so as to dispose the sealing member on the element connecting part, while housing the sealing member into the outer jacket, and sealing the outer jacket by the sealing member and the external terminal.

The external terminal is a columnar or tubular body, and includes a tapered part provided on an outer periphery thereof, and a sealing part linked to the tapered part. When the sealing member is housed inside the outer jacket, at least a part of the outer periphery of the sealing member is housed inside the outer jacket before a sealing portion of the external terminal comes in contact with the insertion hole of the sealing member. Then, after the sealing member is housed in the outer jacket, a part of the external terminal is exposed from the sealing member.

According to this manufacturing method, an end of the open of the outer jacket comes in contact with the sealing member before the untapered sealing part of the external terminal when the external terminal is inserted into the insertion hole of the sealing member as the sealing member is housed inside the outer jacket. Therefore, the position of the outer wall of the sealing member inside the outer jacket is determined with reference to the position of inner wall at the end of the opening that comes in contact first. Accordingly, the sealing member can be further inserted into the outer jacket even after the position of the outer wall of the sealing member is determined. Aforementioned electric storage device of the embodiments is configured by setting dimensional relationship of the external terminal, sealing member, and outer jacket such that at least a part of the outer periphery of the sealing member can be housed inside the outer jacket before the sealing part of the external terminal comes in contact with the insertion hole of the sealing member.

BRIEF DESCRIPTION OF DRAWINGS

FIG. 10A is a front sectional view of an electric double layer capacitor in accordance with a second exemplary embodiment.

FIG. 10B is a side sectional view of the electric double layer capacitor shown in FIG. 10A.

DETAILED DESCRIPTION OF PREFERRED EMBODIMENTS

Figure 21:
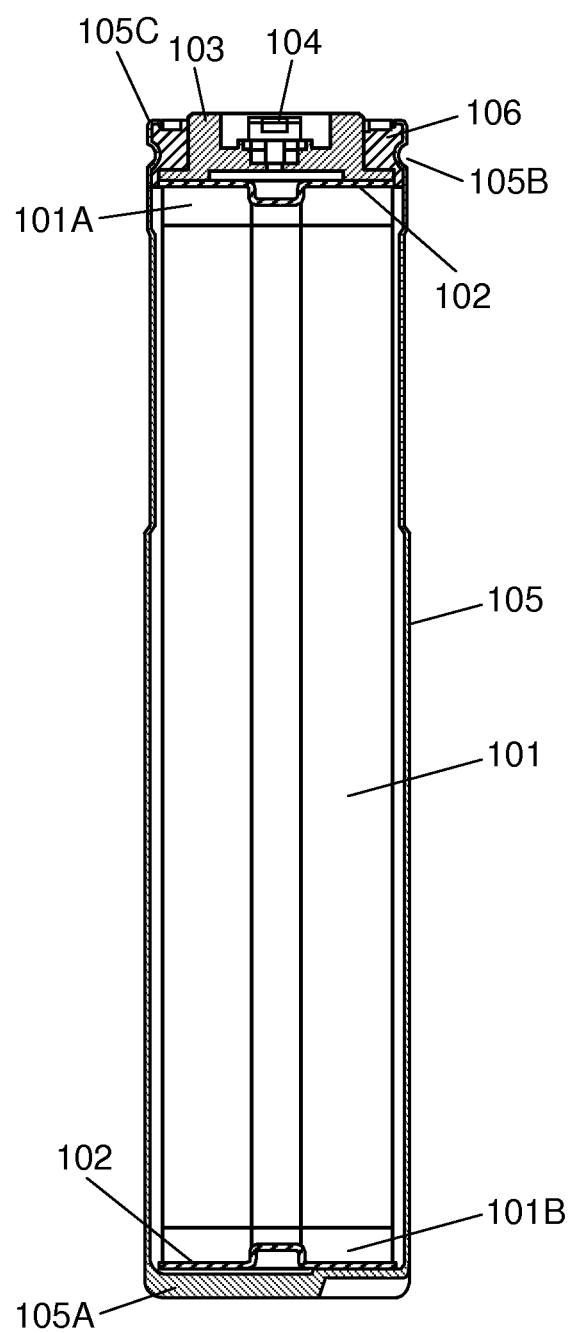
FIG. 21 is a front sectional view of the electric double layer capacitor as an example of a conventional electric storage device.

Before describing exemplary embodiments, disadvantages in a conventional structure is described. An electric double layer capacitor shown in FIG. 21 certainly has low resistance. However, case 105 and terminal plate 103 from which a pair of electrodes are led out, respectively, need to be insulated from each other in order to lead out one of the electrodes from an opening of case 105 via terminal 103. In addition, annular or tubular sealing rubber 106 needs to be provided such that it covers the outer periphery of terminal plate 103, in order to seal the opening of case 105.

In this case, sealing rubber 106 is generally disposed inside case 105 while a part of electrode plate 103 is inserted into a through hole created in sealing rubber 106. When terminal plate 103 is inserted into sealing rubber 106, an inner wall of sealing rubber 106 slides against terminal plate 103, and an outer wall thereof slides against case 105. Since a friction resistance on the surface of sealing rubber 106 is large, this friction resistance may degrade workability at inserting terminal plate 103.

An electric storage device in the exemplary embodiments is described hereinafter with reference to drawings. However, the present disclosure is not limited in anyway by the exemplary embodiments.

First Exemplary Embodiment

Figure 1A:
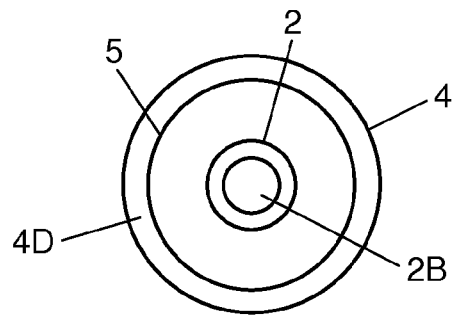
FIG. 1A is a top view of an electric double layer capacitor in accordance with a first exemplary embodiment.
Figure 1B:
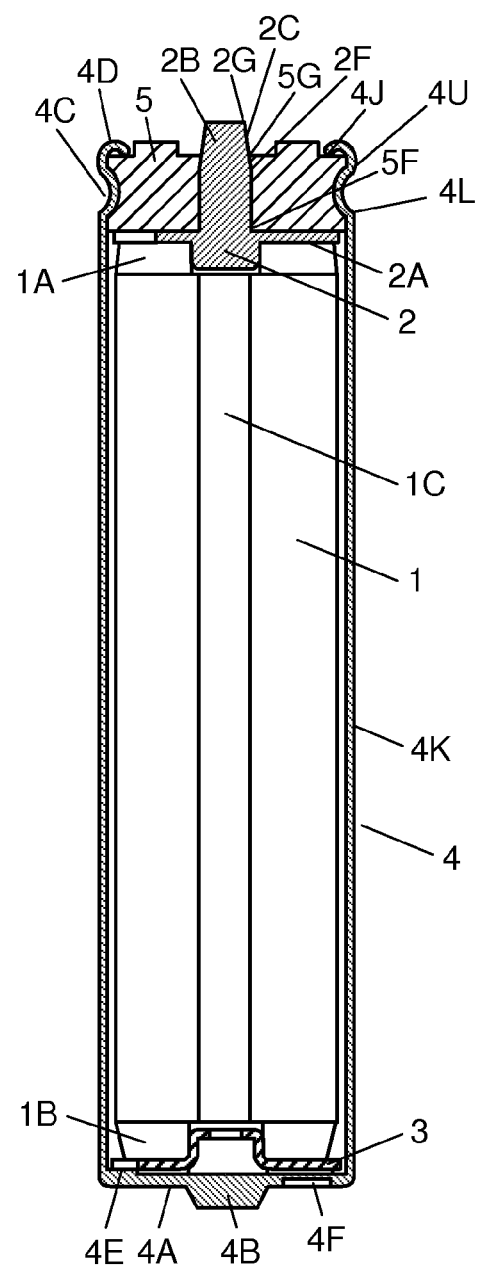
FIG. 1B is a front sectional view of the electric double layer capacitor shown in FIG. 1A.

FIG. 1A is a top view of an electric double layer capacitor that is an example of the electric storage device in the first exemplary embodiment. FIG. 1B is a front sectional view of this electric double layer capacitor. This electric double layer capacitor includes capacitor element 1 as an electric storage element, electrolyte (not illustrated) with which capacitor element 1 is impregnated, terminal plate 2, collector plate 3, outer jacket 4 with bottom 4A, and sealing member 5.

Capacitor element 1 includes a positive electrode as a first electrode, and a negative electrode as a second electrode. Capacitor element 1 has element end 1A as a first end from which the positive electrode is led out, and element end 1B as a second end opposite to the first end.

In this exemplary embodiment, capacitor element 1 has a wound structure, and has element end 1A for leading out the positive electrode and element end 1B for leading out the negative electrode at its both ends in the winding axis direction. In this way, the electrodes with different polarities from each other are led out from a pair of opposed ends, respectively. The positive electrode and the negative electrode may be at reverse ends. The structure of capacitor element is also not limited to the wound structure. As long as the electrodes are lead out from both opposed ends, respectively, the structure is not particularly limited. For example, the capacitor element may have a multilayer structure in which the positive electrode, negative electrode, and separator are laminated one after another, or a structure in which positive and negative electrodes face each other and are folded in a zigzag manner.

Capacitor element 1 includes the positive electrode and negative electrode which face each other and a separator between these electrodes (none of them are illustrated). Each of the positive electrode and the negative electrode includes a metal-foil collector, such as aluminum, and an electrode layer containing carbon material formed on the surface of this collector except for one edge (none of them are illustrated). The separator is typically formed of cellulose.

The positive electrode and the negative electrode face each other such that their portions without electrode layers protrude in opposite directions. These electrodes and the separator between them are wound to configure capacitor element 1. In other words, capacitor element 1 is a wound body. Since the positive electrode, negative electrode, and separator are wound, hollow 1C that is a space is formed after winding so as to penetrate in the winding axis direction. The portions without positive and negative electrode layers are respectively bundled together to form element ends 1A and 1B at both ends in the winding axis direction. As described above, capacitor element 1 is substantially cylindrical and has hollow 1C at its center.

As for electrolyte, an electrolytic solution prepared, for example, by dissolving ethyltrimethyl ammonium tetrafluoroborate as a supporting electrolyte in γ-butyrolactone as a solvent may be used. The concentration is, for example, 1.0 mol/l.

Terminal plate 2 includes plate-shaped element connecting part 2A and external terminal 2B connected to element connecting part 2A and also to outside. Element connecting part 2A is electrically connected to the positive electrode at element end 1A of capacitor element 1. External terminal 2B is provided on rear side of the face of element connecting part 2A connected to capacitor element 1. Terminal plate 2 is, for example, made of aluminum.

Collector plate 3 is joined to the negative electrode at element end 1B. Collector plate 3 is made of a conductive plate-shaped metal, such as aluminum plate.

Outer jacket 4 is tubular (cylindrical) and has bottom 4A and side wall 4K provided with an opening opposite to bottom 4A. Outer jacket 4 is made of a conductive material, such as metal. Outer jacket 4 houses capacitor element 1 together with terminal plate 2, collector plate 3, and electrolyte such that terminal plate 2 is positioned nearer aforementioned opening than bottom 4A. Outer jacket 4 is, for example, made of aluminum.

Sealing member 5 is disposed on element connecting part 2A, and is provided with insertion hole 5A to which external terminal 2B is inserted. Sealing member 5 seals the opening in outer jacket 4 together with external terminal 2B. Sealing member 5 is, for example, made of butyl rubber.

Figure 2A:
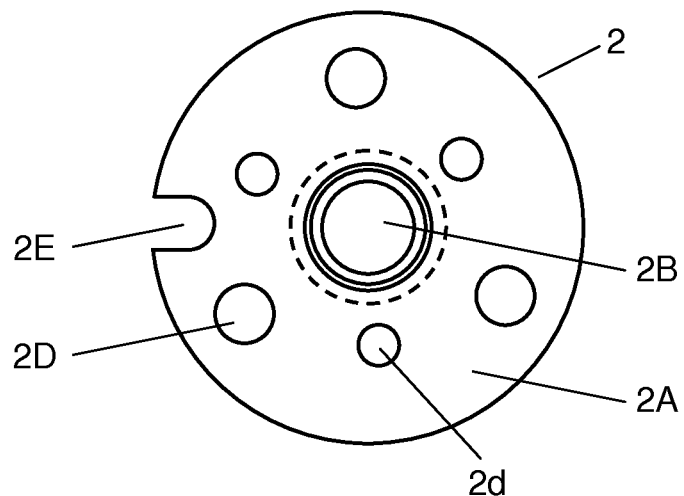
FIG. 2A is a top view of a terminal plate used in the electric double layer capacitor shown in FIG. 1B.
Figure 2B:
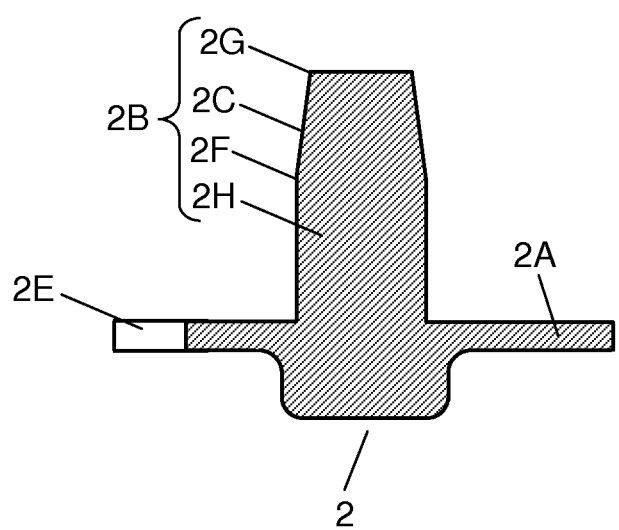
FIG. 2B is a front sectional view of the terminal plate shown in FIG. 2A.
Figure 3A:
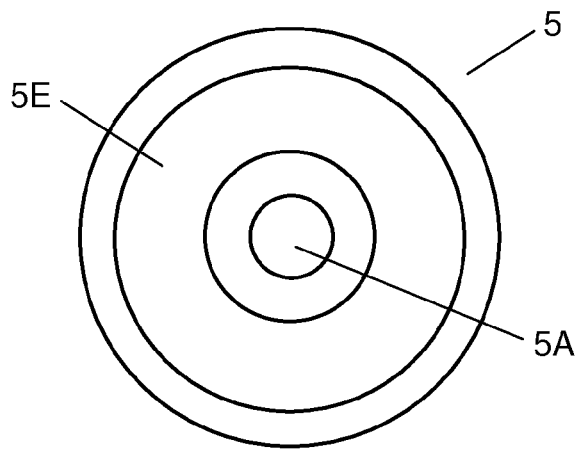
FIG. 3A is a top view of a sealing member used in the electric double layer capacitor shown in FIG. 1B
Figure 3B:
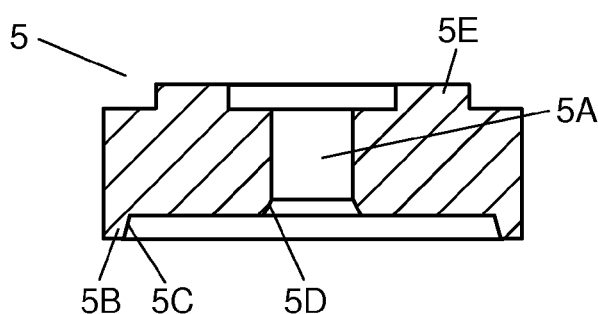
FIG. 3B is a front sectional view of the sealing member shown in FIG. 3A.
Figure 3C:
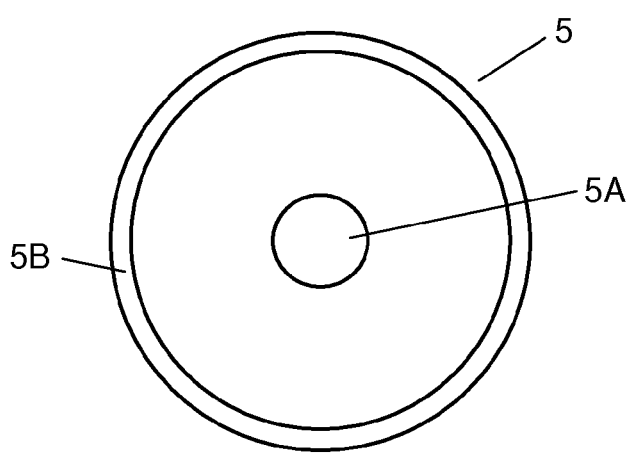
FIG. 3C is a bottom view of the sealing member shown in FIG. 3A.

Terminal plate 2 and sealing member 5 are detailed below with reference to FIGS. 2A to 3C. FIG. 2A is a top view of terminal plate 2, and FIG. 2B is a front sectional view of terminal plate 2. FIGS. 3A, 3B, and 3C are a top view, a front sectional view, and a bottom view of sealing member 5, respectively.

Terminal plate 2 is formed of a conductive material, such as metal. As described above, terminal plate 2 includes disk-like element connecting part 2A and columnar external terminal 2B that leads out the electrode provided on the outer surface of element connecting part 2A. As shown in FIG. 2B, external terminal 2B is columnar or tubular (cylindrical), and tapered part 2C whose tip is the narrowest is formed on the outer periphery at the tip of external terminal 2B. To impregnate capacitor element 1 with the electrolytic solution from outside, pouring holes 2D and 2d are created in the thickness direction of element connecting part 2A. The thickness direction is a first direction extending from bottom 4A to the opening of outer jacket 4. In other words, the thickness direction is a vertical direction when bottom 4A of outer jacket 4 is placed on a horizontal plane.

As shown in FIGS. 3A to 3C, sealing member 5 is formed with at least a cylindrical elastic material. As described above, insertion hole 5A is formed at the center of sealing member 5. Sealing member 5 is disposed on element connecting part 2A of terminal plate 2 in the state that external terminal 2B of terminal plate 2 is inserted in insertion hole 5A.

The outer wall of sealing member 5 faces the inner wall of the opening of outer jacket 4. The inner wall of sealing member 5 is a face exposed on insertion hole 5A. To seal this opening, drawn part 4C protruding inward of outer jacket 4 is processed on the outer face at side wall 4K of outer jacket 4 where the inner face of side wall 4K faces the outer wall of sealing member 5. The opening in outer jacket 4 is sealed by compressing sealing member 5 with drawn part 4C.

The end of the opening of outer jacket 4 is bent inward of outer jacket 4, and curled part 4D is processed to make side fall edge 4J come in contact with the top face of sealing member 5. Curled part 4D suppresses displacement of sealing member 5 in the vertical direction (in particular, upward direction) relative to element connecting part 2A when an inner pressure of outer jacket 4 increases.

The top face of sealing member 5 is provided with protrusion 5E formed by thickening and rising sealing member 5 between external terminal 2B of terminal plate 2 partially exposed from insertion hole 5A and curled part 4D.

The electric double layer capacitor in the exemplary embodiment is configured as described above.

The electric double layer capacitor in the exemplary embodiment has the following characteristics. First, external terminal 2B of terminal plate 2 is columnar or tubular, and includes tapered part 2C provided on the top face at the tip and the outer periphery, and sealing part 2H linked to tapered part 2C. Tapered part 2C has first end 2F and second end 2G that is farther from element connecting part 2A than first end 2F. For example, in the exemplary embodiment, first end 2F is at the bottom end of tapered part 2C, and second end 2G is at the top end of tapered part 2C, as shown in FIG. 1B. A part of external terminal 2B protrudes outside from sealing member 5. At least a part of the outer periphery of sealing member 5 is housed inside outer jacket 4 before sealing part 2H of external terminal 2B comes in contact with insertion hole 5A of sealing member 5 when sealing member 5 is housed inside outer jacket 4 while external terminal 2B is inserted into insertion hole 5A of sealing member 5. This structure can increase workability of insertion of sealing member 5 that is gradually housed in outer jacket 4 as external terminal 2B is inserted.

As shown in FIG. 1B, side wall edge 4J refers to an edge sharpened by the wall face of side wall 4K. Therefore, if curled part 4C is processed at the top end of the opening of outer jacket 4, a curved portion formed at the top end of outer jacket 4 does not fall under side wall edge 4J. In this case, side wall edge 4J refers to an end of a part extended inward of outer jacket 4. The position (height) of side wall edge 4J of outer jacket 4 is specified by at least one of the height of side wall edge 4J of outer jacket 4 after drawn part 4C is processed on side wall 4K and the height of side wall edge 4J of outer jacket 4 before drawn part 4C is formed. In particular, to specify the position of side wall edge 4J before processing based on the structure after processing, a length of a part protruded inward of outer jacket 4 is not considered as drawn part 4C of outer jacket 4. If drawn part 4C is provided, a shortest distance connecting bottom end 4L where deformation for protruding inward of outer jacket 4 starts to top end 4U where deformation completes is the height of drawn part 4C.

Figure 4A:
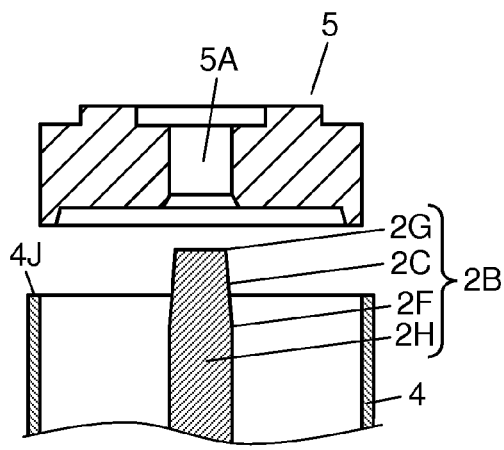
FIG. 4A is a schematic sectional view illustrating the state of inserting an external terminal of the terminal plate shown in FIG. 2B into the sealing member shown in FIG. 3B while the sealing member is housed in an outer jacket.
Figure 4C:
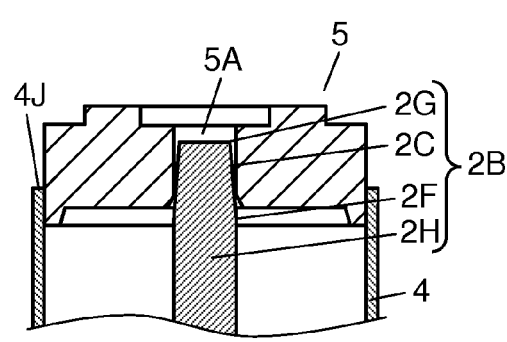
FIG. 4C is a schematic sectional view illustrating the state of inserting the external terminal of the terminal plate shown in FIG. 2B into the sealing member shown in FIG. 3B while the sealing member is housed in the outer jacket.
Figure 4B:
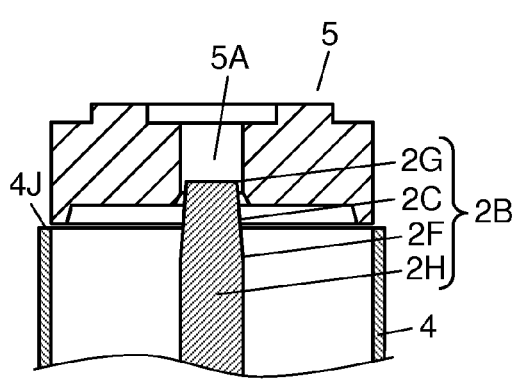
FIG. 4B is a schematic sectional view illustrating the state of inserting the external terminal of the terminal plate shown in FIG. 2B into the sealing member shown in FIG. 3B while the sealing member is housed in the outer jacket.
Figure 4D:
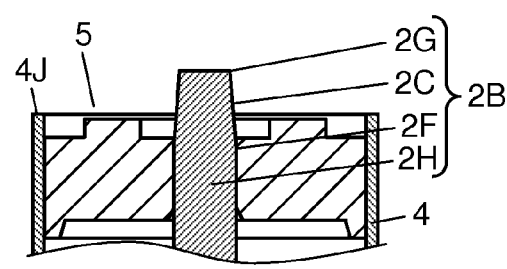
FIG. 4D is a schematic sectional view illustrating the state of inserting the external terminal of the terminal plate shown in FIG. 2B into the sealing member shown in FIG. 3B while the sealing member is housed in the outer jacket.
Figure 5:
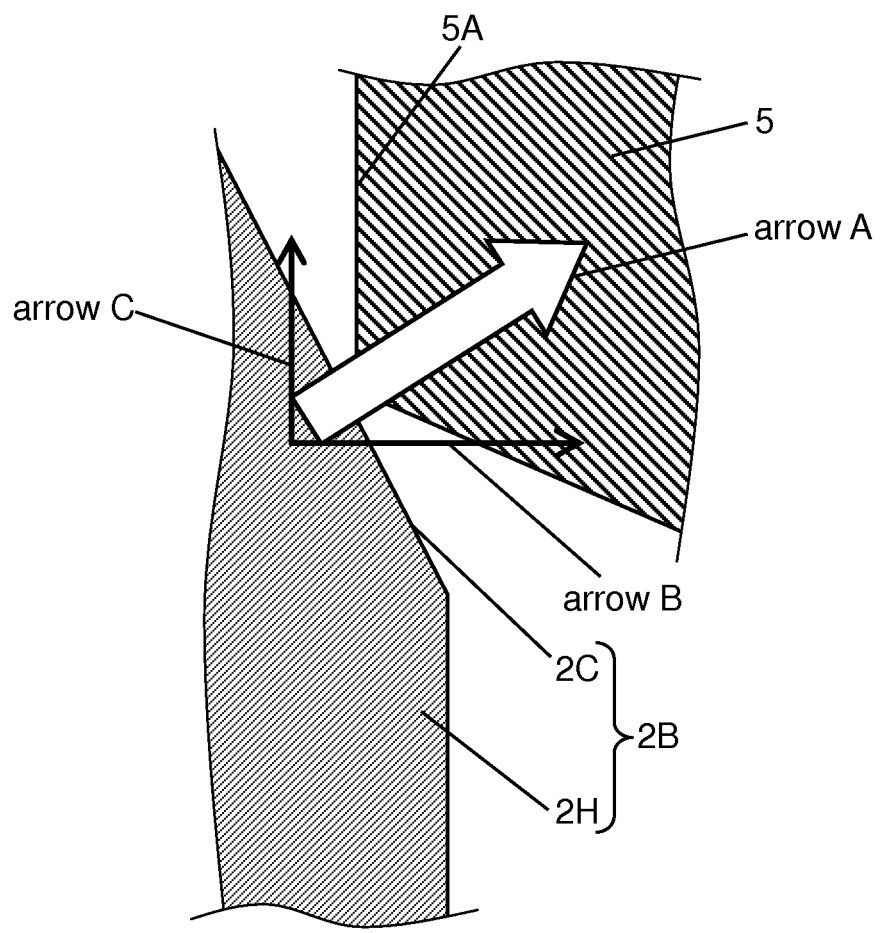
FIG. 5 shows an extracted image of the state of the external terminal of the terminal plate shown in FIG. 2B and the sealing member shown in FIG. 3B when the sealing member and the external terminal are in contact.

Next is described procedures for inserting external terminal 2B into sealing member 5 while sealing member 5 is housed inside outer jacket 4, with reference to FIGS. 4A to 4D and FIG. 5. FIG. 4A to 4D are schematic sectional views when external terminal 2B is inserted into sealing member 5 while sealing member 5 is housed inside outer jacket 4. FIG. 5 is an extracted image of the state that external terminal 2B is in contact with sealing member 5.

FIG. 4A illustrates the state that capacitor element 1 is fabricated, element connecting part 2A of terminal plate 2 is connected to element end 1A, and capacitor element 1 to which terminal plate 2 is connected is housed in outer jacket 4 together with the electrolyte such that terminal plate 2 is located nearer the opening than the bottom. As shown in FIG. 4A, a tip of external terminal 2B is at a position higher than side wall edge 4J, and is protruded outside of outer jacket 4. When sealing member 5 is moved close to outer jacket 4 and external terminal 2B, the tip of external terminal 2B enters insertion hole 5A of sealing member 5 first, as shown in FIG. 4B. This tentatively positions sealing member 5 relative to external terminal 2B. In other words, the tip of external terminal 2B and insertion hole 5A function as guides.

Aforementioned first end 2F close to element connecting part 2A in tapered part 2C is at a position closer to element connecting part 2A than the position of side wall edge 4J of outer jacket 4. Therefore, the outer wall of sealing member 5 is inserted into outer jacket 4 before an untapered sealing part 2H of external terminal 2B enters the narrowest part of insertion hole 5A, as shown in FIG. 4C, when external terminal 2B is inserted into sealing member 5 while sealing member 5 is further housed inside outer jacket 4.

When external terminal 2B is further inserted into sealing member 5 as well as sealing member 5 is housed inside outer jacket 4, sealing part 2H is inserted into the narrowest part of insertion hole 5A, as shown in FIG. 4D. At last, most of tapered part 2C of external terminal 2B protrudes from sealing member 5.

In this way, when external terminal 2B is inserted into sealing member 5 while sealing member 5 is housed inside outer jacket 5, side wall edge 4J comes in contact with sealing member 5 earlier than sealing part 2H that will actively come in contact with sealing member 5. Accordingly, the position of outer wall of sealing member 5 inside outer jacket 4 is determined based on the position of the inner wall of side wall edge 4J that comes in contact first. Since sealing member 5 is already in contact with the inner wall of side wall edge 4J, which is inside outer jacket 4, sealing member 5 can be continuously inserted into outer jacket 4 even after the position of the outer wall of sealing member 5 is determined.

On the other hand, if first end 2F of tapered part 2C is at a position higher than side wall edge 4J, sealing member 5 actively comes in contact with sealing part 2H of external terminal 2B in insertion hole 5A before the outer wall thereof comes in contact with the inner wall of outer jacket 4. In this case, the position of the outer wall of sealing member 5 is determined based on the position of the outer wall of sealing part 2H. Then, after the position of the outer wall of sealing member 5 is determined, sealing member 5 comes in contact with side wall edge 4J.

If external terminal 2B is displaced from the center axis in the height direction of cylindrical outer jacket 4, the position of the outer wall of sealing member becomes deviated in line with positional deviation of external terminal 2B. This positional deviation of sealing member 5 may cause a part of the outer wall of sealing member 5 protrude outside of outer jacket 4 from the position of the inner wall of side wall edge 4J. In this case, a part of sealing member 5 in contact with the end face of outer jacket 4 hinders further progress of sealing member 5. Housing of sealing member 5 inside outer jacket 4 thus becomes difficult.

On the other hand, the position of sealing member 5 is determined by the contact condition with the inner periphery of the opening of outer jacket 4 in this exemplary embodiment. In other words, feasibility of housing sealing member 5 inside outer jacket 4 is firstly confirmed by continuously inserting external terminal 2B. Thereafter, sealing member 5 can come in contact with sealing part 2H at insertion hole 5A. Therefore, as described above, the disadvantage that housing of sealing member 5 inside outer jacket 4 becomes difficult due to the protruded part can be suppressed. This structure can easily house sealing member 5 without separately preparing a guide jig for housing sealing member 5 inside outer jacket 4.

As shown in FIG. 5, if the position of external terminal 2B is deviated from the center axis of outer jacket 4, the opening of insertion hole 5A comes in contact with a sloped face of tapered part 2C before reaching sealing part 2H. In this case, the opening of insertion hole 5A receives a stress indicated by arrow A in the direction perpendicular to this sloped face, depending on an angle of slope of tapered part 2C.

The stress shown by arrow A can be decomposed to a stress indicated by arrow B in the horizontal direction relative to element connecting part 2A of terminal plate 2 and a stress indicated by arrow C in the vertical direction relative to element connecting part 2A. Generation of the stress of arrow B applies a compression stress in the horizontal direction to insertion hole 5A. This broadens the opening area of insertion hole 5A. As a result, even if the position of external terminal 2B is slightly deviated, external terminal 2B can be inserted while absorbing this deviation to a compression limit of sealing member 5.

However, if sealing member 5 comes in contact with side wall edge 4J of outer jacket 4 in the state that external terminal 2B is not inserted into sealing member 5, the tip of external terminal 2B and the bottom of sealing member 5 may contact, depending on a degree of positional deviation of external terminal 2B. In this case, insertion of external terminal 2B into insertion hole 5A also becomes difficult. Accordingly, as described above, the position of the tip of external terminal 2B is preferably higher than that of side wall edge 4J of outer jacket 4.

The above positional relationship results in establishing the following positional relationship in a state after drawn part 4C and curled part 4D are processed. Specifically, side wall edge 4J at the opening of outer jacket 4 is positioned between first end 2F and second end 2G of tapered part 2C in the first direction extending from bottom 4A to the opening of outer jacket 4. As described above, the first direction is a vertical direction relative to bottom 4A when bottom 4A is placed horizontally. It is a direction along which side wall 4K of outer jacket 4 extends.

In a structure that does not satisfy the above positional relationship, side wall edge 4J is, for example, positioned above second end 2G. In this case, the top end of side wall 4K of outer jacket 4 is always at a position higher than that of the top end of terminal plate 2. If these electric double layer capacitors are electrically connected, using a connector (not illustrated), this connector needs to be processed into a shape that can connect one of external terminals 2B across the top end (in particular, curled part) of side wall 4K between two electric double layer capacitors disposed in parallel. This decreases connection flexibility. In addition, if side wall edge 4J is positioned lower than first end 2F, sealing part 4H becomes tall due to the need of a certain space between side wall edge 4J and element connecting part 2A for forming drawn part 4C. As a result, external terminal 2B tends to become tall. This may enlarge the size of the electric double layer capacitor.

As shown in FIG. 1B, it is defined that the bottom end of the inner wall of insertion hole 5A of sealing member 5 is first end 5F, and the top end farther from element connecting part 2A than first end 5F in the above first direction is second end 5G. In this definition, it is preferable that first end 2F of tapered part 2C is positioned above bottom end 4L of drawn part 4C, i.e., farther from element connecting part 2A; and below second end 5G of the inner wall of insertion hole 5A, i.e., close to element connecting part 2A. Compared to the structure that first end 2F of tapered part 2C is not positioned in this range, a stress is unevenly generated on external terminal 2B in the height direction in the structure that first end 2F of tapered part 2C is positioned in this aforementioned range. As a result, a sealing stress applied to the outer wall of external terminal 2B is concentrated and locally increased. This can increase reliability of sealing at the opening of outer jacket 4. One of forms of time degradation of sealing member 5 is a decrease in sealing stress. However, this structure can maintain good sealing stress. The sealing stress to be applied to external terminal 2B from sealing member 5 can be calculated by measuring in advance the relationship of distortion and stress of the sealing member that will be a specimen, setting the sealing structure of the opening to be used for stress analysis of this specimen, and analyzing the stress using known simulation software. In the front sectional view of outer jacket 4 as shown in FIG. 1B, a cross section of side wall 4K of outer jacket 4 is formed substantially straight to a predetermined height from bottom 4A. There is a point of changing from substantially straight to curved line (changed point) in this cross section. In the description, a portion where this changed point is provided is defined as bottom end 4L of drawn part 4C. In other words, bottom end 4L of drawn part 4C is an end farther from side wall edge 4J in the first direction.

In sealing member 5, circular skirt 5B that extends toward bottom 4A of outer jacket 4 is preferably formed on the outer-peripheral end of the bottom facing element connecting part 2A of terminal plate 2. Skirt 5B is circular or tubular (cylindrical), and is formed of an insulating material same as or different from the main part of sealing member 5. Skirt 5B has a function to insulate the outer peripheral end of element connecting part 2A of terminal plate 2 and the confronting inner wall of outer jacket 4. Reliability improves by providing skirt 5B between the outer peripheral end of element connecting part 2A and the inner wall of outer jacket 4 in this way.

Meanwhile, levelness of sealing member 5 in outer jacket 4 may degrade due to some reasons, while external terminal 2B is being inserted into sealing member 5. In this case, a protruding direction of skirt 5B also changes in an oblique direction, depending on an angle that sealing member 5 is tilted from the direction perpendicular to element connecting part 2A. On the other hand, a space between element connecting part 2A and outer jacket 4 extends in the direction perpendicular to element connecting part 2A. Therefore, it becomes difficult to insert skirt 5B into this space. In some cases, sealing member 5 may be housed in outer jacket 4 without skirt 5B being inserted into this space. Therefore, as shown in FIG. 3B, it is further preferable to provide tapered part 5C on skirt 5B at the inner side.

By providing tapered part 5C, a sloped face of tapered part 5C becomes parallel to the outer peripheral end of element connecting part 2A or this sloped face comes in contact with element connecting part 2A even if sealing member 5 is tilted to the extent of a tapering angle of tapered part 5C. Accordingly, compared to the structure without tapered part 5C, flexibility in inserting skirt 5B into the above space improves. Skirt 5B is not limited to a circular shape. It may be provided intermittently on the outer peripheral end.

Still more, as shown in FIG. 3B, tapered part 5D is preferably provided on the inner periphery of the opening at the bottom (a face confronting terminal plate 2) in sealing member 5. Tapered part 5D broadens the distance between the outer wall of external terminal 2B and the inner wall at insertion hole 5A. This can more reliably avoid contact of external terminal 2B and the inner wall at insertion hole 5A. A friction resistance can thus be reduced.

The opening of outer jacket 4 is sealed with sealing member 5 and external terminal 2B of terminal plate 2. In this case, gas generated inside outer jacket 4 is discharged through sealing member 5. This structure eliminates the need of a pressure-adjusting valve (not illustrated), and thus the electric double layer capacitor can be used in the state it is laid sideways. In addition, a space for providing the pressure-adjusting valve on the opening face of outer jacket 4 can be eliminated. Accordingly, the overall electric double layer capacitor is downsized.

Figure 6A:
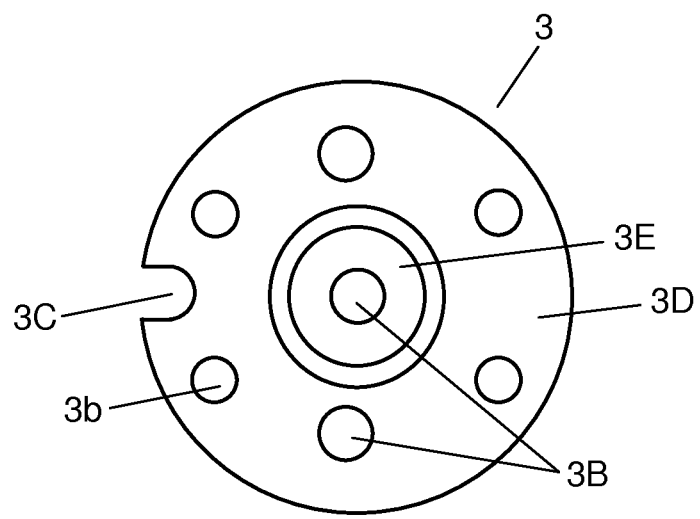
FIG. 6A is a top view of a collector plate of the electric double layer capacitor shown in FIG. 1B.
Figure 6B:
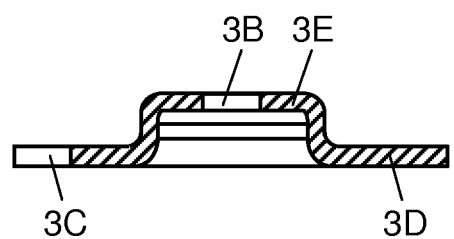
FIG. 6B is a front sectional view of the collector plate shown in FIG. 6A.
Figure 7:
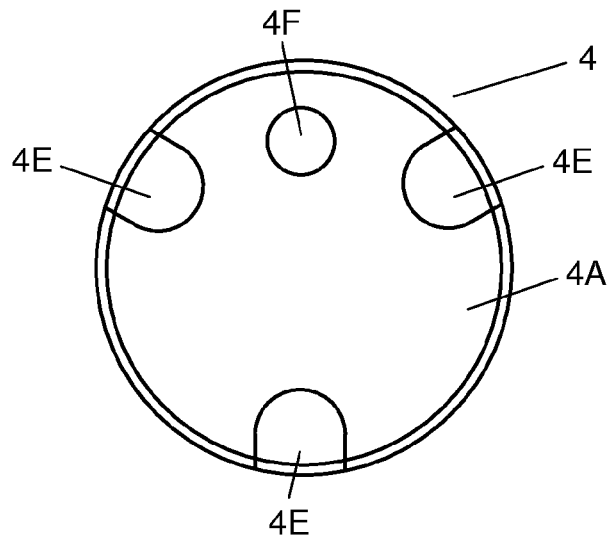
FIG. 7 is a plan view illustrating the inner side of a bottom of the outer jacket in the electric double layer capacitor shown in FIG. 1B.
Figure 8:
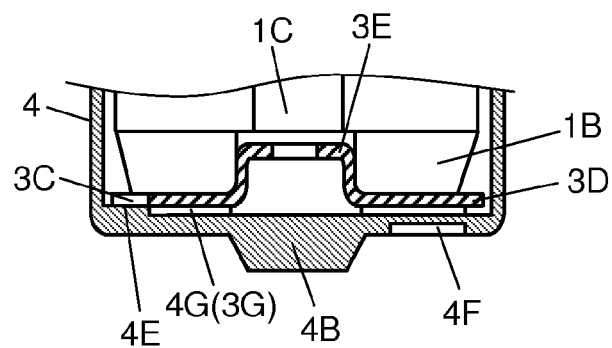
FIG. 8 is an enlarged front sectional view illustrating a joining state of the outer jacket and the collector plate in the electric double layer capacitor shown in FIG. 1B.

Next, a structure of collector plate 4, bottom 4A of outer jacket 4, and terminal plate 2 is described with reference to FIGS. 6A to 9 in addition to FIG. 2A. FIGS. 6A and 6B are a plan view and a front sectional view of collector plate 3. FIG. 7 is a plan view illustrating the inner side of bottom 4A of outer jacket 4. FIG. 8 is a front sectional view partially magnifying the joined state of outer jacket 4 and collector plate 3.

Figure 9:
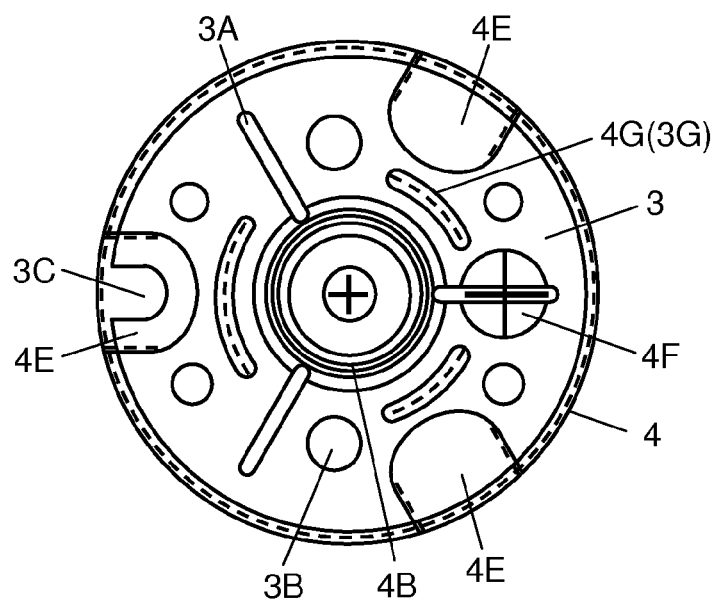
FIG. 9 is a perspective bottom view illustrating the bottom of the outer jacket passing through the collector plate in the electric double layer capacitor shown in FIG. 1B.

FIG. 9 is a bottom perspective view of bottom 4A of outer jacket 4 seeing through collector plate 3.

As described above, collector plate 3 is formed of a conductive plate, such as metal. As shown in FIGS. 6A and 6B, collector plate 3 includes disk plate 3D and protrusion 3E provided at the center of disk plate 3D. As shown in FIG. 8, protrusion 3E is disposed facing hollow 1C of capacitor element 1. Disk plate 3D and protrusion 3E are provided with pouring holes 3B and disk plate 3D is provided with notch 3C on the outer periphery thereof. Disk plate 3D includes element connecting part 3A and outer jacket connecting part 3G as shown in FIGS. 8 and 9. Element connecting part 3A is joined to element end 1B. Outer jacket connecting part 3G comes in contact with joining part 4G on bottom 4A of outer jacket 4, and welded together.

On the other hand, as shown in FIG. 7, contact part 4E that protrudes toward the opening and contacts collector plate 3 is formed on the inner face of bottom 4A of outer jacket 4. In addition, as shown in FIG. 8, external connecting part 4B protruding outward for connecting with a connection bar (not illustrated) is formed on the outer face of bottom 4A. A recess is formed on the outer face of bottom 4A at a position different from external connecting part 4B. For example, a cross cut is created at the bottom of this recess. Mechanical strength at this cut is weaker compared to a portion without cut. When the inner pressure in outer jacket 4 exceeds a predetermined level, outer jacket 4 opens from this cut. Valve 4F is provided in this way.

As shown in FIG. 8, a space is created between a portion, of collector plate 3, not in contact with contact part 4E and bottom 4A of outer jacket 4 by contact of contact part 4E and collector plate 3. Outer jacket connecting part 3G of collector plate 3 and the inner face of bottom 4A are welded at this space where collector plate 3 and outer jacket 4 are not in contact. This portion in bottom 4A is joining part 4G.

As shown in FIG. 2A, terminal plate 2 is provided with notch 2E on the outer peripheral end of element connecting part 2A thereof. Collector plate 3 is provided with notch 3C at a position facing notch 2E via capacitor element 1. In other words, notch 3C of collector plate 3 and notch 2E of element connecting part 2A face each other in a direction extending from bottom 4A to the opening of outer jacket 4, i.e., a direction perpendicular to bottom 4A. Such a structure is preferable.

By making these notches face each other, notch 2E serves a reference for positioning element connecting part 2A and collector plate 3 in a rotating direction with reference to an axis of external terminal 2B. In other words, the position of collector plate 3 in the rotating direction can be determined by determining the position of notch 2E. Accordingly, the position of connecting part of collector plate 3 relative to capacitor element 1 can be determined with reference to notch 2E.

In other words, the position of collector plate 3 at the bottom of outer jacket 4 can be judged by looking at the position of notch 2E. Accordingly, double melting of element connecting part 3A that is a connecting part of collector plate 3 and capacitor element 1 is preventable when welding outer jacket-connecting part 3G of collector 3 and joining part 4G of outer jacket 4 from outside of outer jacket 4. When a positioning reference is provided as described above, it is preferable that a structure has no rotation symmetry with reference to the center of the face where the reference is provided.

As described above, positioning parts are preferably provided at positions of terminal plate 2 and collector plate 3 where they face each other via capacitor element 1. This enables to know the state of collector plate 3 housed in outer jacket 4, which is difficult to see, based on other members, and avoid welding the position of element connecting part 3A where collector plate 3 and capacitor element 1 are connected together when outer jacket 4 and collector plate 3 is welded. The positioning part may be, for example, a hole with different size from pouring hole 3B, protrusion, or partially-colored part instead of the notch. In other words, each of collector plate 3 and element connecting part 2A is set rotationally asymmetric to be used as a positioning part.

However, it is preferable to provide the positioning parts on the outer peripheral ends of element connecting part 2A and collector plate 3, such as notches 2E and 3C. In this structure of positioning by the outer peripheral ends, the relative position in the rotating direction can be confirmed after joining terminal plate 2 and collector plate 3 to capacitor element 1 just by looking at capacitor element 1 from the side face. As a result, productivity can be improved. Accordingly, each of the outer shape of collector plate 3 and outer shape of element connecting part 2A is preferably rotationally asymmetric.

When the positioning part is provided inside the outer periphery, a protrusion protruding from capacitor element 1 that is higher than the outer peripheral end needs to be provided, in order to enable to visually recognize the positioning part. In this case, the shape of element connecting part 2A may become complicated or the weight may be increased.

By the use of a jig (not illustrated) that has a pair of insertion parts that fit into spaces in notches 2E and 3C, terminal plate 2 and collector plate 3 can be positioned at once in capacitor element 1 when terminal plate 2 and collector plate 3 are disposed on and welded to element ends 1A and 1B of capacitor element 1. This also improves productivity.

Still more, burr may exist on the surface of welded portion. In other words, burr may exist at a connecting part of collector plate 3 to capacitor element 1. If contact parts 4E come in contact with this connecting part in the state containing burr, height of collector plate 3 varies among contact parts 4E and the levelness of collector plate 3 may decrease. Therefore, as shown in FIG. 9, it is preferable to dispose the notch of collector plate 3 above contact part 4E of outer jacket 4, and make a portion of collector plate 3 contact with contact part 4E, except for the connected part (welded part) with capacitor element 1.

Still more, valve 4F may be used for positioning collector plate 3 and bottom 4A of outer jacket 4. Valve 4F is a component without rotation symmetry to the center of bottom 4A, and is provided at the position off the center of bottom 4A of outer jacket 4. In this case, bottom 4A of outer jacket 4 is rotationally asymmetric. For example, three of contact parts 4E are provided on the outer peripheral end of the inner face of bottom 4A at interval such that the inner angle formed by straight lines connecting the center of bottom 4A and contact parts 4E is 120°. The position of joining part 4G can be determined with reference to the positional relationship of a straight line connecting the center of bottom 4A and the position of valve 4F and a straight line connecting the above center and contact part 4E.

Here, to facilitate identification of the positional condition of collector plate 3, the position of joining collector plate 3 to outer jacket 4 is preferably determined with reference to the positional relationship of a straight line linking contact part 4E in contact with notch 3C of collector plate 3 in three contact parts 4E and the center of bottom 4A and a straight line linking the center of bottom 4A and valve 4F. Here, the center of bottom 4A, valve 4F, and the notch lie on one straight line when the above two straight lines mutually point the same direction or opposite directions The position of the joining part of collector plate 3 with capacitor element 1 can be easily determined based on the position of the straight lines. In other words, the position of notch 3C can be easily identified based on the position of valve 4F.

The position of joining part 4G on bottom 4A of outer jacket 4 can be set with reference to the positions of the above straight lines such that the position of the joining part with capacitor element 1 is avoided. With this structure, an overlap of the position of joining part 4G with element connecting part 3A can be easily avoided at bottom 4A. As a result, the possibility of re-melting the part of collector plate 3 connected to capacitor element 1 can be reduced.

In the above description, valve 4F is used as a positioning part without rotation symmetry with reference to the center of bottom 4A. However, aforementioned positioning part may be formed separately on bottom 4A.

When the inner pressure in outer jacket 4 rises, bottom 4A may swell. In this case, swelling gradually progresses from the center of bottom 4A in the radial direction. In other words, displacement at the center of bottom 4A will be the largest due to swelling. Therefore, joining part 4G is preferably formed around the center of bottom 4A of outer jacket 4. This structure improves reliability of welding compared to the structure of radially forming joining part 4G from the center. In other words, formation of joining part 4G at a predetermined interval from the center can delay the peeling timing of outer jacket connecting part 3G from joining part 4G that may occur due to displacement of bottom 4A due to swelling, compared to radial joining parts. Joining reliability between collector plate 3 and outer jacket 4 is thus improved and an increase of resistance on the joining boundary face can be suppressed.

Still more, the opening areas of pouring hole 2D and pouring hole 2d are preferably different. Pouring hole 2D is a first through hole and pouring hole 2d is a second through hole both provided on element connecting part 2A. Or, assuming that notch 2E is not created and element connecting part 2A is a disk plate, distances from the center of element connecting part 2A to pouring hole 2D and to pouring hole 2d are preferably different. This structure enables the open areas of pouring holes 2D and 2d to come in contact with capacitor element 1 at diversifying points. The electrolytic solution can thus be poured from diversifying points in capacitor element 1.

The electrolytic solution also passes through between capacitor element 1 and side wall 4K of outer jacket 4 and is also supplied to capacitor element 1 from the side near collector plate 3. Therefore, the opening areas of pouring hole 3B and pouring hole 3B, both created in collector plate 3, are preferably different. Or, assuming that notch 3C is not created and collector plate 3 is a disk plate, distances from the center of collector plate 3 to pouring hole 3B and to pouring hole 3b are preferably different.

Still more, pouring holes 2D and 2d created in terminal plate 2 and pouring holes 3B and 3b created in collector plate 3 preferably have portions not facing each other. In other words, pouring holes 2D and 2d that are terminal plate through holes and pouring holes 3B and 3b that are collector plate through holes preferably do not coincident in a direction extending from bottom 4A to the opening of outer jacket 4. That is to say, a part of the open areas preferably have opposed portions. These partially opposed portions establish a path where the electrolytic solution poured into collector plate 3 from terminal plate 2 via capacitor element 1 passes through. The electrolytic solution passes through this path and further enters into capacitor element 1 through non-corresponding portions provided at different positions. By setting different positions for non-corresponding portions of pouring holes 2D, 2d, 3B, and 3b, the electrolytic solution can be poured into diversifying portions in capacitor element 1. As a result, the pouring efficiency of entire capacitor element 1 increases.

Second Exemplary Embodiment

FIG. 10A is a front sectional view of an electric double layer capacitor as an example of an electric storage device in the second exemplary embodiment. FIG. 10B is a side sectional view thereof. Major points where this exemplary embodiment differ from that of the first exemplary embodiment is terminal plate 32 instead of terminal plate 2, collector plate 33 instead of collector plate 3, and that terminal plate holder 6 and collector plate holder 7 are added. In addition, sealing member 5 does not have skirt 5B. Other than these points, the basic structure is same as that of the first exemplary embodiment, and thus its detailed description may be omitted.

More specifically, terminal plate 32 joined to element end 1A of capacitor element 1 is housed and fixed inside terminal plate holder 6. Collector plate 33 joined to element end 1B of capacitor element 1 is housed and fixed inside collector plate holder 7. On the inner face of bottom 4A of outer jacket 4, collector plate connecting part 4H is formed so as to protrude toward the opening of outer jacket 4, be fixed to collector plate holder 7, and be in contact with collector plate 33.

Figure 11:
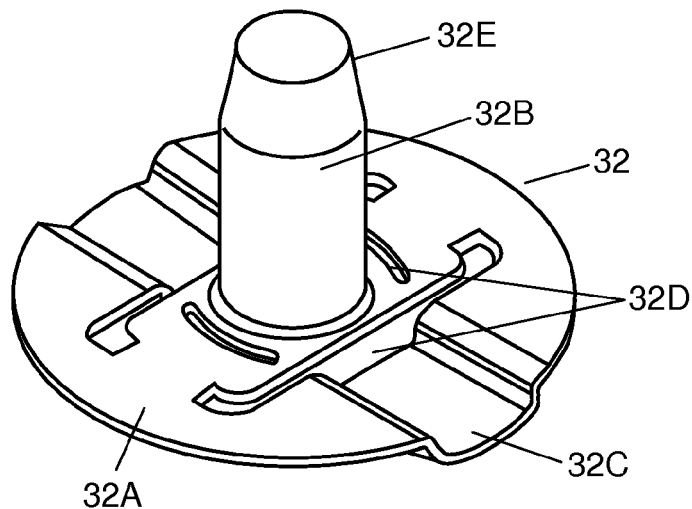
FIG. 11 is a perspective view of a terminal plate used in the electric double layer capacitor shown in FIG. 10A.
Figure 12A:
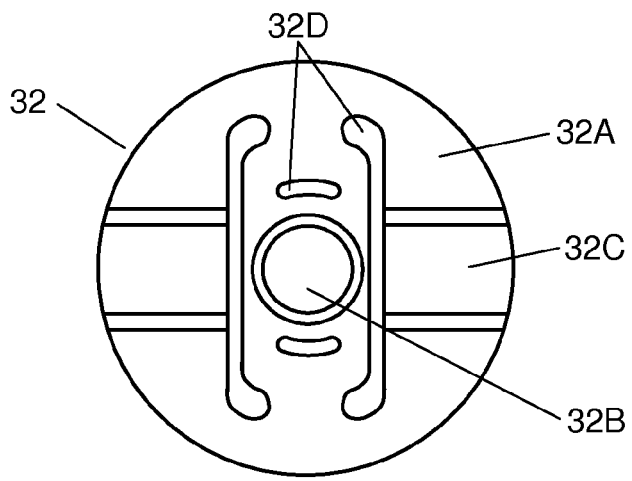
FIG. 12A is a top view of a terminal plate shown in FIG. 11.
Figure 12B:
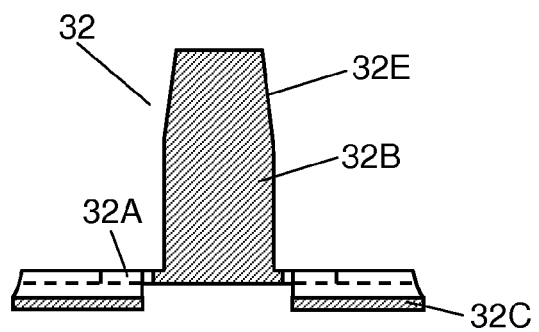
FIG. 12B is a front sectional view of the terminal plate shown in FIG. 11.

Next, terminal plate 32 is described with reference to FIGS. 11 to 12B. FIG. 11 is a perspective view of terminal plate 32, FIG. 12A is a top view of terminal plate 32, and FIG. 12B is a front sectional view of terminal plate 32.

Terminal plate 32 is formed of a conductive material, such as metal. Terminal plate 32 includes disk-shaped element connecting part 32A and external terminal 32B. Element connecting part 32A is connected (joined) to element end 1A of capacitor element 1. External terminal 32B is provided on the outer surface of element connecting part 32A, and is columnar for leading out an electrode. Element connecting part 32A is provided with element joining part 32C so as to protrude toward element end 1A for being welded onto element end 1A. Element connecting part 32A is also provided with slit holes 32D between external terminal 32B and element joining part 32C. External terminal 32B is provided with tapered part 32E on the outer periphery at a tip thereof. Terminal plate 32 is formed of aluminum, for example.

Figure 13:
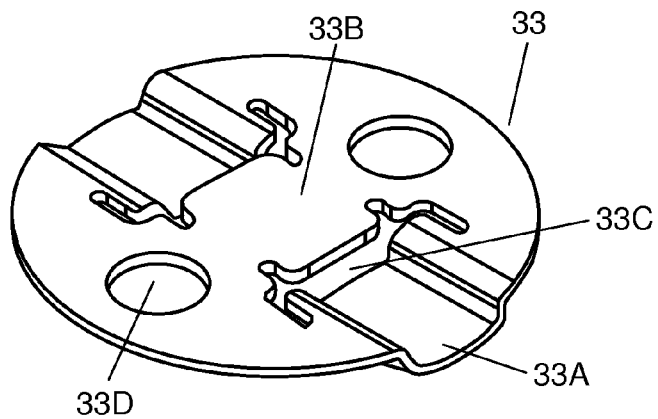
FIG. 13 is a perspective view of a collector plate used in the electric double layer capacitor shown in FIG. 10A.
Figure 14:
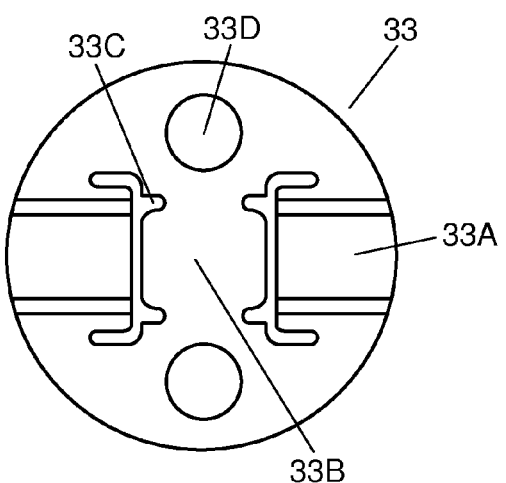
FIG. 14 is a bottom view of the collector plate shown in FIG. 13.

Next, collector plate 33 is described with reference to FIGS. 13 and 14. FIG. 13 is a perspective view of collector plate 33 and FIG. 14 is a bottom view of collector plate 33.

Collector plate 33 is formed of a conductive plate, such as metal. Collector plate 33 includes element connecting part 33A and outer jacket connecting part 33B. Element connecting part 33A protrudes toward element end 1B so that it can be welded onto element end 1B. Outer jacket connecting part 33B is provided at a position facing hollow 1C of capacitor element 1. Outer jacket connecting part 33B comes in contact with collector plate connecting part 4H in bottom 4A of outer jacket 4, as shown in FIGS. 10A and 10B, and is welded. Slit holes 33C are formed between element connecting part 33A and outer jacket connecting part 33B. Pouring hole 33D is formed at a position different from element connecting part 33A and outer jacket connecting part 33B. Collector plate 33 is, for example, formed of aluminum. Outer jacket connecting part 33B is welded onto collector plate connecting part 4H by inserting an electrode tool of a resistance welder from hollow 1C of capacitor element 1 from the opposite side.

Figure 15A:
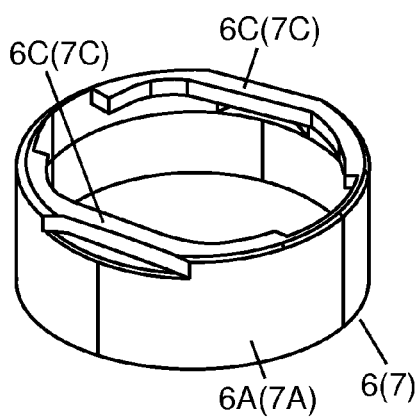
FIG. 15A is a top perspective view of a terminal plate holder or collector plate holder used in the electric double layer capacitor shown in FIG. 10A.
Figure 15B:
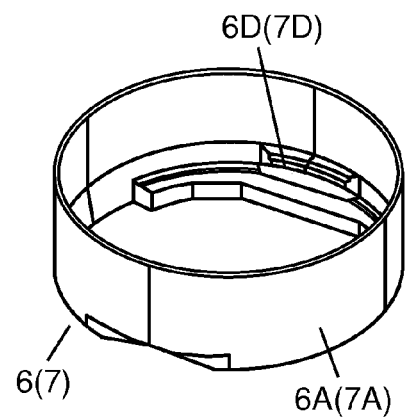
FIG. 15B is a bottom perspective view of the terminal plate holder or collector plate holder shown in FIG. 15A.
Figure 16A:
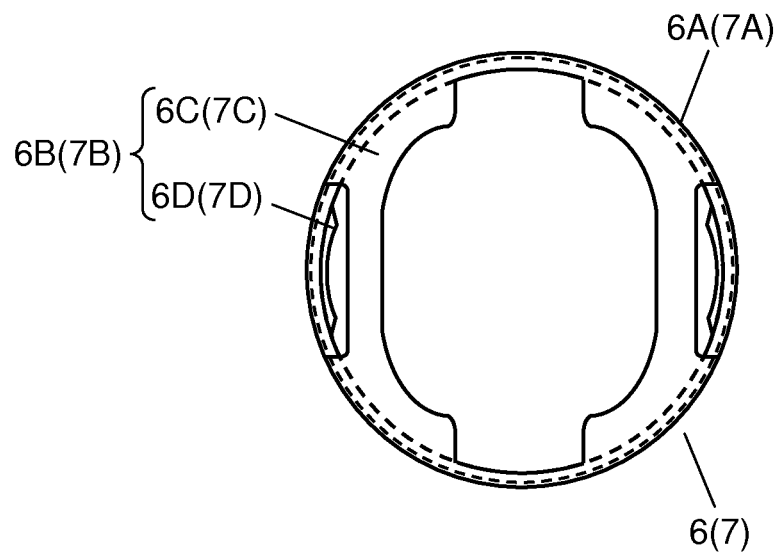
FIG. 16A is a top view of the terminal plate holder or collector plate holder shown in FIG. 15A.
Figure 16B:
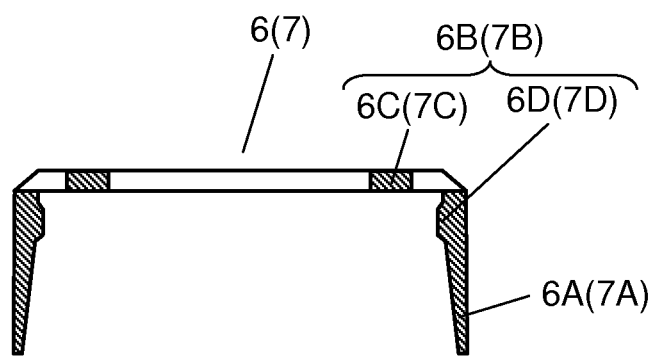
FIG. 16B is a front sectional view of the terminal plate holder or collector plate holder shown in FIG. 15A.

Next, terminal plate holder 6 and collector plate holder 7 are described with reference to FIGS. 15A to 16B. FIG. 15A is a top perspective view of terminal plate holder 6, and FIG. 15B is a bottom perspective view of terminal plate holder 6. FIG. 16A is a top view of terminal plate holder 6, and FIG.

16B is a front sectional view of terminal plate holder 6. Since collector plate holder 7 has a structure same as that of terminal plate holder 6, reference marks in brackets are indicated in the drawings. Terminal plate holder 6 and collector plate holder 7 are formed of insulating material, such as polypropylene.

Terminal plate holder 6 includes tubular (columnar) part 6A and fixing part 6B. Tubular part 6A covers and houses an outer peripheral end of terminal plate 32. Fixing part 6B is provided on an inner wall of tubular part 6A, and supports terminal plate 32 housed in tubular part 6A.

More specifically, fixing part 6B is formed of two components that are flat part 6C and protrusion 6D. Flat part 6C is formed such that it partially covers tubular part 6A from one end of an opening thereof to the outer peripheral end on a face of the opening. Protrusion 6D is formed on the inner side of tubular part 6A at a predetermined distance with flat part 6C. Protrusion 6D and tubular part 6A establishes a snap-fit structure to sandwich and fix terminal plate 32 between flat part 6C and protrusion 6D. In this structure, tubular part 6A proves effective same as skirt 5B of sealing member 5 in the first exemplary embodiment.

In the same way, collector plate holder 7 includes tubular (columnar) part 7A and fixing part 7B. Tubular part 7A covers and houses an outer peripheral end of collector plate 33. Fixing part 7B is provided on an inner wall of tubular part 7A, and supports collector plate 33 housed inside tubular part 7A.

More specifically, fixing part 7B is formed of two components that are flat part 7C and protrusion 7D. Flat part 7C is formed such that it partially covers tubular part 7A from one end of an opening thereof to the outer peripheral end on a face of the opening. Protrusion 7D is formed on the inner side of tubular part 7A at a predetermined distance with flat part 7C. Protrusion 7D and tubular part 7A establish a snap-fit structure to sandwich and fix collector plate 33 between flat part 7C and protrusion 7D.

Positions and dimensional relationship of sealing member 5, tapered part 32E of external terminal 32B, and outer jacket 4 are same as the relationship of sealing member 5, tapered part 2C of external terminal 2B, and outer jacket 4 in the first exemplary embodiment. the electric double layer capacitor in this exemplary embodiment is configured as above.

In the above structure, outer jacket connecting part 33B of collector plate 33 joined to element end 1B of capacitor element 1 and collector plate connecting part 4H of outer jacket 4 can be joined by resistance welding from the collector plate 33 side. In this case, collector plate 33 is melted ahead of outer jacket 4, and thus piercing in outer jacket 4 can be suppressed. Collector plate connecting part 4H is provided at a position (connecting part) facing hollow 1C, where collector plate 33 does not face capacitor element 1. As a trace of welding, a welding mark is exposed at least on the top face of outer jacket connecting part 33B. In addition, collector plate connecting part 4H is thicker than outer jacket connecting part 33B. In other words, collector plate 33 is thicker than bottom 4A of outer jacket 4 at the above-mentioned connecting part. Therefore, a reaction force from thick collector plate connecting part 4H to outer jacket connecting part 33B can be applied against a pressure in the resistance welding that applies pressure to outer jacket connecting part 33B and welds this pressurized part. Accordingly, reliability at welding can be increased.

Still more, collector plate connecting part 4H is formed protruding from bottom 4A of outer jacket 4. In other words, collector plate connecting part 4H is preferably provided as a protrusion protruding from the inner side of bottom 4A at the connecting part of bottom 4A of outer jacket 4 and collector plate 33. Therefore, a contact area with outer jacket connecting part 33B is smaller compared to the structure of applying resistance welding to a bottom formed thicker than collector plate 33. Accordingly, a stronger reaction force (stress) can be achieved.

As an example, resistance welding is applied, using a DC resistance equipment, to 0.6-mm thick outer jacket connecting part 33B and 5.00-mm thick collector plate connecting part 4H (1.0 mm at a portion excluding collector plate connecting part 4H). As an example, conditions of the resistance equipment are 9.6 V, 7.8 kA, and 8 ms. A curvature radius at the electrode tip is 30 mm.

Figure 17A:
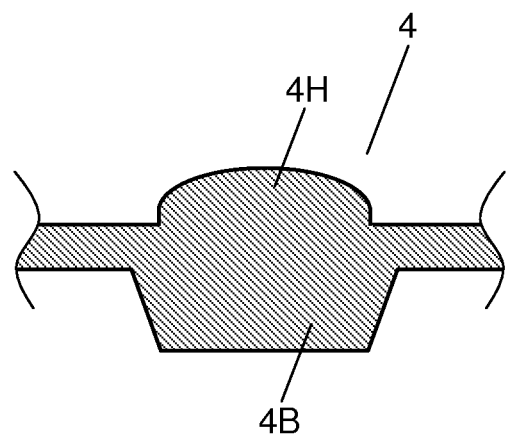
FIG. 17A is an enlarged partial sectional view of another outer jacket in the electric double layer capacitor shown in FIG. 10A.
Figure 17B:
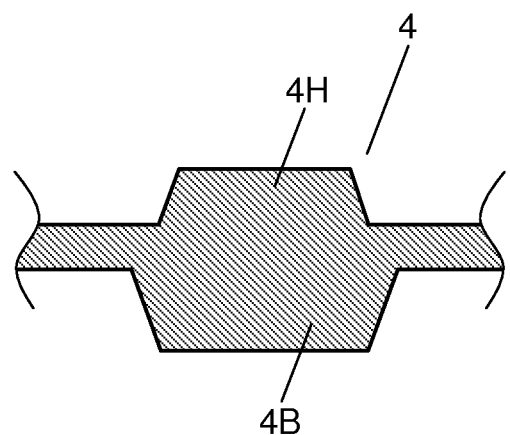
FIG. 17B is an enlarged partial sectional view of still another outer jacket in the electric double layer capacitor shown in FIG. 10A.

Next, a further preferable example of collector plate connecting part 4H is described with reference to FIGS. 17A and 17B. FIGS. 17A and 17B are enlarged partial sectional view of outer jacket 4. In a structure shown in FIG. 17A, an end face of the tip of collector plate connecting part 4H is a spherical face and not flat face. In a structure in FIG. 17B, the outer periphery of collector plate connecting part 4H is tapered. These structures further decrease a contact area, and can thus further increase reaction force to outer jacket connecting part 33B.

Alternatively, the reaction force may be increased by decreasing the contact area by providing a protrusion, i.e., a projection, on the joining face of outer jacket connecting part 33B. Or, a protrusion protruding outward may be provided on the outer side of bottom 4A of outer jacket 4 at a portion where the connecting part for collector plate 33 is formed. In this case, external connecting part 4B shown in FIG. 10B can be used as the protrusion.

Still more, in the electric double layer capacitor in this exemplary embodiment, collector plate 33 and outer jacket 4 come in contact and are electrically connected only at outer jacket connecting part 33B and collector plate connecting part 4H. In other words, a portion in collector plate 33 except for outer jacket connecting part 33B is not in contact with outer jacket 4 formed of a conductive material. Therefore, the current that should be consumed in outer jacket connecting part 33B can be prevented from dispersing. In other words, energy input for welding is concentrated on a part to be welded. As a result, highly-reliable welding can be achieved.

Still more, the protrusion of collector plate connecting part 4H from bottom 4A enables to determine a position of collector plate 33 based on the height of collector plate connecting part 4H and insulate collector plate 33 at a position away from bottom 4A. In addition, flat part 7C of collector plate holder 7 is positioned at a part other than the contact part of collector plate 33 and bottom 4A of outer jacket 4. Since flat part 7C is made of an insulating material, physical and electrical insulation accuracy can be reliably improved at a portion other than the joining part.

Instead of collector plate holder 7, an insulating sheet with a through hole large enough to house collector plate connecting part 4H may be disposed on the inner face of bottom 4A, or an insulating film may be formed on a portion on bottom 4A, excluding collector plate connecting part 4H. By providing an insulating material to insulate between at least a part of a portion excluding collector plate connecting part 4H and the inner face of bottom 4A of outer jacket 4, the above effect can be achieved.

Next is described an effect of slit holes 32D in terminal plate 32 shown in FIG. 11 and a slit hole in collector plate 33 shown in FIG. 13.

As described above, slit holes 32D are provided between element connecting part 32C and external terminal 32B. Therefore, external terminal 32B can be displaced in the first direction (vertical direction) extending from bottom 4A to the opening of outer jacket 4, independently of element connecting part 32C. Element connecting part 32A can thus act as a damper with slit holes 32D.

In the same way, slit holes 33C are provided between element connecting part 33A and outer jacket connecting part 33B. Therefore, outer jacket connecting part 33B can be displaced in the first direction (vertical direction) extending from bottom 4A to the opening of outer jacket 4, independently of element connecting part 33A. Collector plate 33 can thus act as a damper with slit holes 33C.

When sealing the opening of outer jacket 4, or when an inner pressure of outer jacket 4 increases, sealing member 5 may swell. If sealing member 5 swells, a stress is applied to capacitor element 1 joined to terminal plate 32 and collector plate 33, in the winding axis direction thereof. By absorbing the stress with the effect of the damper, application of a stress to element connecting part 32C and element connecting part 33A can be suppressed. As a result, an increase of resistance in element ends 1A and 1B can be suppressed. Long-term reliability can be secured by providing slit holes 32D in terminal plate 32 and slit holes 33C in collector plate 33.

To increase the function of this damper, it is preferable to form slit holes 32D around (but not completely in a ring shape) one of external terminal 32B and element connecting part 32C. In the same way, it is preferable to form slit holes 33C around (but not completely in a ring shape) one of outer jacket connecting part 33B and element connecting part 33A.

Figure 18A:
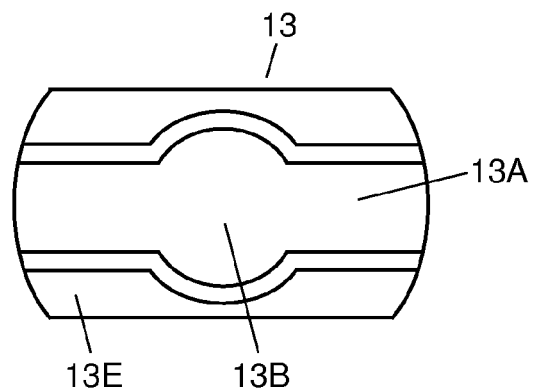
FIG. 18A is a bottom view of another collector plate in the electric double layer capacitor in accordance with the second exemplary embodiment.
Figure 18B:
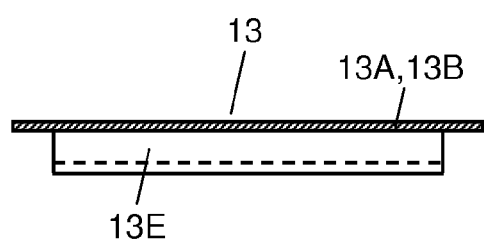
FIG. 18B is a front sectional view of the collector plate shown in FIG. 18A.
Figure 18C:
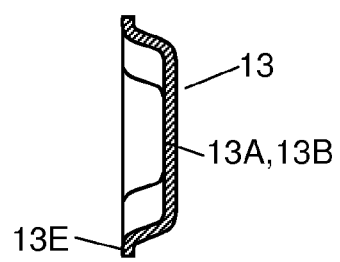
FIG. 18C is a side sectional view of the collector plate shown in FIG. 18A.
Figure 19:
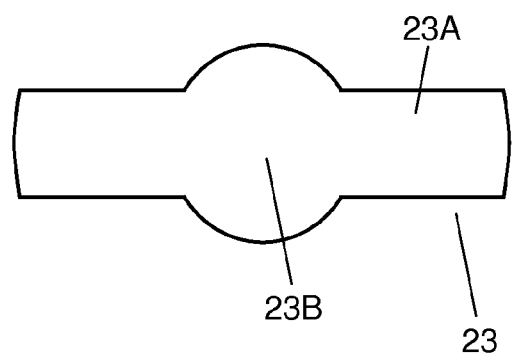
FIG. 19 is a bottom view of still another collector plate in the electric double layer capacitor in accordance with the second exemplary embodiment.

Next is described a collector plate with a structure different from that of collector plate 33 with reference to FIGS. 18A to 19. FIG. 18A is a bottom view of another collector plate, collector plate 13, used in the electric double layer capacitor in the exemplary embodiment. FIG. 18B is a front sectional view of collector plate 13, and FIG. 18C is a side sectional view of collector plate 13. FIG. 19 is a bottom view of still another collector plate.

First, collector plate 13 is described. Collector plate 13 includes element connecting part 13A connected to element end 1B of capacitor element 1, and outer jacket connecting part 13B connected to collector plate connecting part 4H of outer jacket 4. Element connecting part 13A and outer jacket connecting part 13B has a flat shape and are provided on a same plane. Flange 13E is provided around flat element connecting part 13A and outer jacket connecting part 13B. Flange 13E protrudes from around element connecting part 13A and outer jacket connecting part 13B toward bottom 4A of outer jacket 4, and its edge extends in the horizontal direction relative to bottom 4A.

Since element connecting part 13A and outer jacket connecting part 13B are on the same plane, a position of end face in element end 1B of a portion in contact with element connecting part 13A is fixed by the height of the top end of collector plate connecting part 4H. On the other hand, in element end 1B, a portion not in contact further protrudes toward bottom 4A. Flange 13E comes in contact with this end face not in contact with element connecting part 13A. Therefore, the position of end face not in contact with element connecting part 13A can also be fixed by the position of flange 13E. As a result, a space is provided in collector plate 33 and outer jacket 4 between at least a part of the portion excluding the connecting part and the inner face of bottom 4A of outer jacket 4. In collector plate 33, at least a part of a portion excluding the connecting part is insulated with outer jacket 4 by this space. Accordingly, flange 13E enables to control the position of the end face of element end 1B at a portion not in contact with element connecting part 13A.

By adjusting the position of flange 13E to the position that does not come in contact with bottom 4A, element end 1B can be prevented from contacting with bottom 4A. As a result, flow of current supplied to parts other than outer jacket connecting part 13B can be suppressed at applying resistance welding to outer jacket connecting part 13B and collector plate connecting part 4H. In other words, electric energy required for welding can be concentrated on outer jacket connecting part 13B.

On the other hand, collector plate 23 shown in FIG. 19 is configured as an integrated plate having areas only required as elements of element connecting part 23A and outer jacket connecting part 23B, respectively, as a simple structure. This enables to reduce material costs, and achieve a low-cost electric storage device.

Figure 20A:
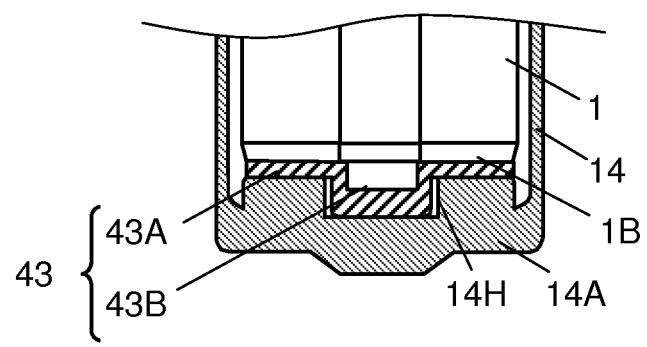
FIG. 20A is a front partial sectional view illustrating a bottom part of the outer jacket before connection for illustrating another connecting method of the collector plate and the outer jacket used in the electric double layer capacitor in accordance with the second exemplary embodiment.
Figure 20B:
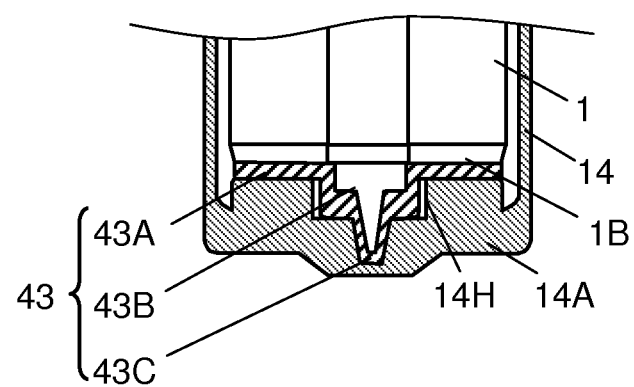
FIG. 20B is a front partial sectional view illustrating the bottom part of the outer jacket after connection for illustrating the other connecting method of the collector plate and the outer jacket used in the electric double layer capacitor in accordance with the second exemplary embodiment.

Next, a connecting structure using other collector plate and outer jacket is described with reference to FIGS. 20A and 20B. FIGS. 20A and 20B are partial front sectional views illustrating structures before and after joining collector plate 43 to the inner bottom of outer jacket 14 by cold welding.

In the structure shown in FIGS. 10A and 10B, the bottom of outer jacket 4 and outer jacket connecting part 33B at the center of collector plate 33 are joined by resistance welding. In contrast, in the structure shown in FIGS. 20A and 20B, collector plate 43 joined to element end 1B of electric storage element 1 is joined to the bottom of cylindrical outer jacket 14 with bottom by cold welding.

As shown in FIG. 20A, collector plate 43 is formed of a conductive material such as metal, and includes flat element connecting part 43A and outer jacket connecting part 43B provided at the center of element connecting part 43A and protruding toward the bottom of outer jacket 14. Outer jacket connecting part 43B is formed thicker than element connecting part 43A in order to be connected to the bottom of outer jacket 14 by cold welding. Collector plate 43 is typically made of aluminum.

Outer jacket 14 is formed of a conductive material such as metal, and includes bottom 14A whose inner face is protruded and collector plate connecting part 14H provided at the center of bottom 14A. Collector plate connecting part 14H is a recess for housing outer jacket connecting part 43B.

This structure, as shown in FIG. 20B, enables to join collector plate 43 and outer jacket 14 by forming pressure-joining part 43C where outer jacket connecting part 43B digs into the bottom of collector plate connecting part 14H. In other words, pressure-joining part 43C is configured with outer jacket connecting part 43B and collector plate connecting part 14H. Since this joining method does not require melting for joining, piercing and the like can be reduced, compared to laser welding.

For cold welding, it is preferable that a thickness ratio of pressure-joining part 43C after pressure-joining to the sum of thickness of collector plate connecting part 14H and outer jacket connecting part 43B before pressure-joining is 0.3 or less. Still more, if this ratio is 0.2 or less, change of resistance at the connecting part over time also becomes small. The sum of thicknesses for collector plate connecting part 14H and outer jacket connecting part 43B before pressure-joining can be identified by thicknesses of non-pressure-joined portion of collector plate connecting part 14H and outer jacket connecting part 43 excluding pressure-joined part 43C after cold welding.

Still more, a ratio of a diameter of a hole bottom of pressure-joined part 43C to an inner diameter of collector plate connecting part 14H or an outer diameter of outer jacket connecting part 43B is preferably 0.6 or less. Still more, if this ratio is 0.4 or less, change of resistance at the connecting part over time also becomes small.

For the electrolytic solution used in the first and second exemplary embodiments, the following materials can be used in addition to aforementioned compositions. As the solvent, at least one of propylene carbonate (PC), ethylene carbonate (EC), and dimethyl carbonate (DMC) can be used. As the supporting electrolyte, at least one of tetraethyl ammonium tetrafluoroborate ($TEABF_4$), triethylmethyl ammonium tetrafluoroborate ($TEMABF_4$), 1-ethyl-3-methyl imidazolium tetrafluoroborate ($EMIBF_4$), 1-ethyl-2,3-dimethyl imidazolium tetrafluoroborate ($EDMIBF_4$), 1,2,3-trimethyl imidazolium tetrafluoroborate ($TMIBF_4$), and 1,3-dimethyl imidazolium tetrafluoroborate ($DMIBF_4$) can be used. The solvent and electrolyte are not particularly limited.

Other than electrolytic solution, a gel electrolyte containing binder in the solvent or solid electrolyte may be used as electrolyte.

Materials used for collector plate 3 and terminal plate 2 are not limited to aforementioned aluminum. Titanium, zirconium, hafnium, niobium, tantalum, chrome, molybdenum, tungsten, manganese, silicon, iron, silver, lead, nickel, copper, platinum, and gold, and their alloys may be used.

The electrode layers of positive electrode and negative electrode may contain a binder such as ammonium salt of carboxylmethyl cellulose and polytetrafluoroethylene, and/or conductive agent such as acetylene black, in addition to a carbon material such as activated carbon. Addition of these materials can shorten a distance between active carbons or improve conductivity, and thus capacitor element 1 can have lower resistance.

Still more, the present disclosure is not limited to the electric double layer capacitor. The present configuration is also applicable to storage batteries mainly using metal material as a collector member of each electrode layer, such as electrochemical capacitors and lithium secondary batteries. In an electrochemical capacitor, lithium ion is used as cation of electrolyte. Lithium is absorbed in a carbon material or metal that can make alloy with cation. Such material is contained in the electrode layer of the negative electrode. The positive electrode is the same as the positive electrode of the electric double layer capacitor. The present disclosure demonstrates an outstanding effect of improving reliability of sealing as aforementioned electric storage device also when applied to electrochemical capacitors and storage batteries.

The electric storage device of the present disclosure improves workability of inserting the sealing member into the outer jacket, and thus productivity in manufacturing an electric storage device can be improved. Accordingly, the use of the present disclosure in various electronic devices that require storing electricity is expected.

What is claimed is:

1. An electric storage device comprising:
   an electric storage element including a first electrode, a second electrode, and a first end from which the first electrode is led out;
   an electrolyte with which the electric storage element is impregnated;
   a terminal plate including an element connecting part electrically connected to the first electrode at the first end, and an external terminal connected to the element connecting part;
   an outer jack including a bottom, and a tubular side wall extending from the bottom and having an opening opposite to the bottom, the outer jacket being formed of a conductive material and housing the electric storage element together with the electrolyte such that the terminal plate is located nearer the opening than the bottom; and
   a sealing member positioned on the element connecting part and having an insertion hole to which the external terminal is inserted, the sealing member sealing the opening of the outer jacket together with the external terminal,
   wherein the external terminal is one of columnar and tubular body with a tapered part on an outer periphery at a tip thereof, a part of the external terminal is exposed from the sealing member, and the tapered part has a first end and a second end farther away from the element connecting part than the first end, and
   an edge of the side wall at the opening of the outer jacket is positioned between the first end and the second end of the tapered part in a first direction extending from the bottom to the opening of the outer jacket.

2. The electric storage device according to claim 1,
   wherein an outer face of the side wall of the outer jacket is provided with a drawn part protruding inward of the outer jacket at a portion where an inner face of the side wall faces an outer wall of the sealing member,
   the sealing member has an inner wall that is in contact with the external terminal, and is exposed on the insertion hole, and
   the first end of the tapered part is positioned between an end of the drawn part at a side farther from the edge of the side wall in the first direction and an edge of the inner wall of the sealing member at a side farther from the element connecting part in the first direction.

3. The electric storage device according to claim 1,
   wherein the sealing member has a face facing the element connecting part of the terminal plate, a skirt extending from an outer peripheral end of the face toward the bottom of the outer jacket, and a tapered part provided on an inner periphery of the skirt.

4. The electric storage device according to claim 1,
   wherein the electric storage element has a second end opposite to the first end,
   the second electrode is led out from the second end,
   the electric storage device further comprises a conductive collector plate electrically connected to the second electrode at the second end,
   the element connecting part of the terminal plate is in a plate shape, and
   the collector plate and the element connecting part are rotationally asymmetric.

5. The electric storage device according to claim 4,
   wherein an outer shape of the collector plate and an outer shape of the element connecting part are rotationally asymmetric.

6. The electric storage device according to claim 5,
   wherein outer peripheries of the collector plate and the element connecting part are provided with notches, respectively, and the notches face each other via the electric storage element.

7. The electric storage device according to claim 4,
   wherein the bottom of the outer jacket is rotationally asymmetric.

8. The electric storage device according to claim 1,
   wherein the electric storage element further includes a separator between the first electrode and the second electrode, and the first electrode, the second electrode, and the separator configure a winding body, and
   the element connecting part of the terminal plate is in a plate shape, and is provided with a first through hole passing through along the first direction and a second through hole passing through along the first direction and having an opening area different from that of the first through hole.

9. The electric storage device according to claim 1,
wherein the electric storage element further includes a separator between the first electrode and the second electrode, and the first electrode, the second electrode, and the separator configure a winding body, and
the element connecting part of the terminal plate is in a disk shape, and is provided with a first through hole passing through along the first direction and a second through hole passing through along the first direction and having a distance from a center of the element connecting part different from that of the first through hole.

10. The electric storage device according to claim 1,
wherein the electric storage element further includes a separator between the first electrode and the second electrode, and the first electrode, the second electrode, and the separator configure a winding body,
the electric storage element has a second end opposite to the first end,
the second electrode is led out from the second end,
the electric storage device further comprises a conductive collector plate electrically connected to the second electrode at the second end,
the element connecting part of the terminal plate is in a plate shape, and is provided with a terminal plate-through hole passing through along the first direction, and
the collector plate has a collector plate-through hole passing through along the first direction, and the terminal plate-through hole is not coincident with the collector plate-through hole viewed along the first direction.

11. The electric storage device according to claim 1, further comprising a terminal plate holder formed of an insulating material, covering an outer surface of the element connecting part of the terminal plate, and having a fixing part configured to support the terminal plate.

12. The electric storage device according to claim 1,
wherein the element connecting part of the terminal plate is in a plate shape, and functions as a damper that allows displacement of the external terminal in the first direction.

13. The electric storage device according to claim 12,
wherein the element connecting part has an element joining part joined to the electric storage element, the terminal plate is provided with a slit hole between the external terminal and the element joining part, and the element connecting part functions as the damper by the slit hole.

14. The electric storage device according to claim 13,
wherein the slit hole surrounds at least one of the external terminal and the element joining part.

15. The electric storage device according to claim 1,
wherein the electric storage element has a second end opposite to the first end,
the second electrode is led out from the second end,
the electric storage device further comprises a conductive collector plate electrically connected to the second electrode at the second end,
the collector plate and the bottom of the outer jacket are connected at a connecting part provided at a portion where the collector plate does not face the electric storage element, and
the bottom of the outer jacket is thicker than the collector plate in the connecting part.

16. The electric storage device according to claim 15,
wherein a protrusion protruding from an inner side of the bottom is provided on the connecting part between the bottom of the outer jacket and the collector plate.

17. The electric storage device according to claim 16,
wherein the protrusion has at least one of a spherical tip and a tapered outer periphery.

18. The electric storage device according to claim 15,
wherein a protrusion protruding outward is provided on an outer side of the bottom of the outer jacket at a portion where the connecting part with the collector plate is formed.

19. The electric storage device according to claim 1,
wherein the electric storage element has a second end opposite to the first end,
the second electrode is led out from the second end,
the electric storage device further comprises a conductive collector plate electrically connected to the second electrode at the second end,
the collector plate and the bottom of the outer jacket are connected at a connecting part provided at a portion where the collector plate does not face the electric storage element, and
at least a part of the collector plate, excluding the connecting part, is insulated from the outer jacket.

20. The electric storage device according to claim 19,
wherein a space is provided between at least a part of the collector plate excluding the connecting part, and an inner face of the bottom of the outer jacket such that the outer jacket is insulated from the collector plate.

21. The electric storage device according to claim 19,
wherein an insulating material is provided between at least a part of the collector plate excluding the connecting part, and an inner face of the bottom of the outer jacket such that the outer jacket is insulated from the collector plate.

22. The electric storage device according to claim 21, further comprising a collector plate holder formed of an insulating material, covering at least a part of an outer surface of the collector plate, and having a support configured to support the collector plate.

23. A method of manufacturing an electric storage device, comprising:
fabricating an electric storage element including a first electrode, a second electrode, and a first end from which the first electrode is led out;
electrically connecting an element connecting part of a terminal plate and the first electrode at the first end of the electric storage element, the terminal plate including the element connecting part and an external terminal connected to the element connecting part;
housing the electric storage element connected to the terminal plate together with an electrolyte in an outer jacket formed of a conductive material and including a bottom and a tubular side wall with an opening opposite to the bottom, such that the terminal plate is located nearer the opening than the bottom;
inserting the external terminal into an insertion hole of a sealing member so as to dispose the sealing member on the element connecting part, while housing the sealing member into the outer jacket; and
sealing the outer jacket with the sealing member and the external terminal,
wherein the external terminal is one of columnar and tubular body, and has a tapered part on an outer periphery at a tip thereof, and a sealing part linked to the tapered part, at least a part of an outer periphery of the sealing member is housed inside the outer jacket before the sealing part of the external terminal comes in contact with the insertion hole of the sealing member when the sealing member is housed in the outer jacket, and a part of the external terminal is exposed from the sealing member after housing the sealing member in the outer jacket.

24. The method of manufacturing an electric storage device according to claim 23, wherein the tapered part includes a first end at a boundary with the sealing part, and a second end farther away from the element connecting part than the first end, and an end of the opening of the outer jacket is positioned between the first end and the second end of the tapered part in a first direction extending from the bottom to the end of the opening of the outer jacket after the electric storage element to which the terminal plate is connected is housed in the outer jacket.

25. The method of manufacturing an electric storage device according to claim 23, wherein the electric storage element is fabricated such that a second end is on a side opposite to the first end and the second electrode is led out from the second end when fabricating the electric storage element, the method of manufacturing further comprises:

electrically connecting a conductive collector plate to the second electrode at the second end before housing the electric storage element in the outer jacket; and connecting the collector plate to the bottom of the outer jacket by resistance welding from the collector plate in a connecting part provided at a portion where the collector plate does not face the electric storage element after the collector plate is electrically connected to the second electrode and the electric storage element is housed in the outer jacket, and the collector plate is thicker than the bottom of the outer jacket in the connecting part.

26. The method of manufacturing an electric storage device according to claim 25, wherein a protrusion is provided on an inner side of the bottom of the outer jacket at the connecting part provided at the portion where the collector plate does not face the electric storage element, and the collector plate and the bottom of the outer jacket are connected by resistance welding in a state that the protrusion and the collector plate are in contact when connecting the collector plate to the bottom of the outer jacket.

27. The method of manufacturing an electric storage device according to claim 23, wherein the electric storage element is fabricated such that a second end is on a side opposite to the first end and the second electrode is led out from the second end when fabricating the electric storage element, the method of manufacturing further comprises:

electrically connecting a conductive collector plate to the second electrode at the second end before housing the electric storage element in the outer jacket; and connecting the collector plate to the bottom of the outer jacket by resistance welding from the collector plate in a connecting part provided at a portion where the collector plate does not face the electric storage element after the collector plate is electrically connected to the second electrode and the electric storage element is housed in the outer jacket, and the collector plate and the bottom of the outer jacket are connected together in a state that at least a part of the collector plate and the outer jacket are insulated, except for the connecting part.

* * * * *